United States Patent
Weissman et al.

(10) Patent No.: US 7,271,749 B2
(45) Date of Patent: Sep. 18, 2007

(54) CONTEXT-BASED DENOISER THAT SIMULTANEOUSLY UPDATES PROBABILITIES FOR MULTIPLE CONTEXTS

(75) Inventors: Itschak Weissman, Menlo Park, CA (US); Erik Ordentlich, San Jose, CA (US); Gadiel Seroussi, Cupertino, CA (US); Marcelo Weinberger, San Jose, CA (US); Sergio Verdu, Princeton, NJ (US); Giovanni Motta, Dana Point, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 239 days.

(21) Appl. No.: 11/180,066

(22) Filed: Jul. 12, 2005

(65) Prior Publication Data

US 2006/0070256 A1   Apr. 6, 2006

Related U.S. Application Data

(60) Provisional application No. 60/611,169, filed on Sep. 14, 2004.

(51) Int. Cl.
*H03M 7/00* (2006.01)
(52) U.S. Cl. .................... 341/107; 375/346
(58) Field of Classification Search ............. 341/107, 341/51, 77; 375/345; 702/191; 714/755, 714/704; 382/232
See application file for complete search history.

(56) References Cited

U.S. PATENT DOCUMENTS

| | | | | |
|---|---|---|---|---|
| 5,533,033 A * | 7/1996 | Ratner | ................... | 714/746 |
| 6,161,209 A * | 12/2000 | Moher | ................... | 714/780 |
| 6,199,186 B1 * | 3/2001 | Chen et al. | ................... | 714/755 |
| 6,542,644 B1 * | 4/2003 | Satoh | ................... | 382/246 |
| 6,700,933 B1 * | 3/2004 | Wu et al. | ................... | 375/240.16 |
| 7,031,884 B1 * | 4/2006 | Radulovic et al. | ................... | 702/189 |
| 7,047,472 B2 * | 5/2006 | Weissman et al. | ................... | 714/746 |
| 7,064,489 B2 * | 6/2006 | Price | ................... | 314/65 |
| 7,095,344 B2 * | 8/2006 | Sekiguchi et al. | ................... | 341/107 |
| 7,120,308 B2 * | 10/2006 | Guleryuz | ................... | 382/254 |
| 7,133,808 B2 * | 11/2006 | Radulovic et al. | ................... | 702/189 |

OTHER PUBLICATIONS

Weissman et al—"Universal Discrete Denoising; Known Channel"—HP LAbs Technical Report—HPL-2003-29—Feb. 10, 2003.
Weinberger et al—"ASpplications of Universal Context Modeling to Lossless Compression of Gray-Scale Images"—Proc Conf on Signals, Systems and Computers—vol. 2 1995.
Weissman et al—"Universal Discrete Denoising"—Proc of the Information Theory Workshop Oct. 2002.

* cited by examiner

*Primary Examiner*—Linh V. Nguyen

(57) ABSTRACT

A discrete, universal denoising method is applied to a noisy signal for which the source alphabet is typically large. The method exploits a priori information regarding expected characteristics of the signal. In particular, using characteristics of a continuous tone image such as continuity and small-scale symmetry allows definition of context classes containing large numbers of image contexts having similar statistical characteristics. Use of the context classes allows extraction of more reliable indications of the characteristic of a clean signal.

28 Claims, 12 Drawing Sheets

$$\Pi = \begin{bmatrix} \pi_1 & \pi_2 & \pi_3 & & \pi_n \\ P_{a_1 \to a_1} & P_{a_1 \to a_2} & P_{a_1 \to a_3} & \cdots & P_{a_1 \to a_n} \\ P_{a_2 \to a_1} & P_{a_2 \to a_2} & P_{a_2 \to a_3} & \cdots & P_{a_2 \to a_n} \\ P_{a_3 \to a_1} & P_{a_3 \to a_2} & P_{a_3 \to a_3} & \cdots & P_{a_3 \to a_n} \\ \vdots & \vdots & \vdots & & \vdots \\ P_{a_n \to a_1} & P_{a_n \to a_2} & P_{a_n \to a_3} & \cdots & P_{a_n \to a_n} \end{bmatrix}$$

FIG. 2C $$\underbrace{\boxed{\begin{array}{c}\text{CLEAN COUNTS}\\ m_C[a_1], m_C[a_2], \ldots m_C[a_n] \\ \underline{218}\end{array}}}_{\text{CLEAN}} \times \underbrace{\begin{bmatrix} P_{a_1 \to a_1} & P_{a_1 \to a_2} & \ldots & P_{a_1 \to a_n} \\ P_{a_2 \to a_1} & P_{a_2 \to a_2} & \ldots & P_{a_2 \to a_n} \\ \vdots & \vdots & & \vdots \\ P_{a_n \to a_1} & P_{a_n \to a_2} & \ldots & P_{a_n \to a_n} \end{bmatrix}}_{\Pi} \cong \underbrace{\boxed{\begin{array}{c}\text{NOISY COUNTS}\\ m_N[a_1], m_N[a_2], \ldots m_N[a_n] \\ \underline{222}\end{array}}}_{\text{NOISY}}$$

$m_C[a_1] \cdot P_{a_1 \to a_1} + m_C[a_2] \cdot P_{a_2 \to a_1} + m_C[a_3] \cdot P_{a_3 \to a_1} + \ldots \; m_C[a_n] \cdot P_{a_n \to a_1} \cong m_N[a_1]$ $m_C[a_1] \cdot P_{a_1 \to a_2} + m_C[a_2] \cdot P_{a_2 \to a_2} + m_C[a_3] \cdot P_{a_3 \to a_2} + \ldots \; m_C[a_n] \cdot P_{a_n \to a_2} \cong m_N[a_2]$ $\vdots$ $m_C[a_1] \cdot P_{a_1 \to a_n} + m_C[a_2] \cdot P_{a_2 \to a_n} + m_C[a_3] \cdot P_{a_3 \to a_n} + \ldots \; m_C[a_n] \cdot P_{a_n \to a_n} \cong m_N[a_2]$

FIG. 2D

|     |     |   |     |     |     |     |
|-----|-----|---|-----|-----|-----|-----|
| 255 | 255 | 0 | 0   | 239 | 255 | 255 |
| 255 | 255 | 0 | 255 | 239 | 255 | 255 |
| 239 | 255 | 0 | 255 | 0   | 255 | 255 |
| 255 | 255 | 0 | 0   | 125 | 255 | 255 |
| 255 | 255 | 0 | 255 | 255 | 255 | 239 |
| 255 | 255 | 16| 255 | 255 | 255 | 255 |
| 255 | 31  | 0 | 255 | 255 | 255 | 255 |

*FIG. 5C*

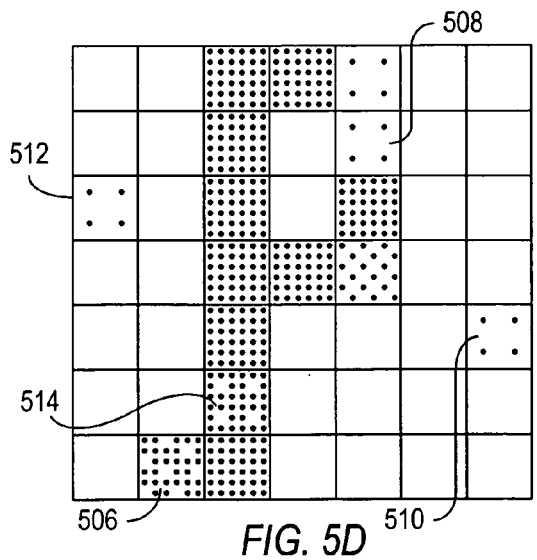

*FIG. 5D*

$$\Lambda = \begin{bmatrix} \lambda_1 & \lambda_2 & \lambda_3 & \cdots & \lambda_n \\ d_{a_1 \to a_1} & d_{a_1 \to a_2} & d_{a_1 \to a_3} & \cdots & d_{a_1 \to a_n} \\ d_{a_2 \to a_1} & d_{a_2 \to a_2} & d_{a_2 \to a_3} & \cdots & d_{a_2 \to a_n} \\ d_{a_3 \to a_1} & d_{a_3 \to a_2} & d_{a_3 \to a_3} & \cdots & d_{a_3 \to a_n} \\ \vdots & \vdots & \vdots & & \vdots \\ d_{a_n \to a_1} & d_{a_n \to a_2} & d_{a_n \to a_3} & \cdots & d_{a_n \to a_n} \end{bmatrix}$$

*FIG. 6*

$$\underbrace{\begin{bmatrix} d_{a_1 \to a_X} \\ d_{a_2 \to a_X} \\ d_{a_3 \to a_X} \\ \vdots \\ d_{a_n \to a_X} \end{bmatrix}}_{\lambda_{a_x}} \odot \underbrace{\begin{bmatrix} P_{a_1 \to a_\alpha} \\ P_{a_2 \to a_\alpha} \\ P_{a_3 \to a_\alpha} \\ \vdots \\ P_{a_n \to a_\alpha} \end{bmatrix}}_{\pi_{a_\alpha}} = \underbrace{\begin{bmatrix} d_{a_1 \to a_X} \cdot P_{a_1 \to a_\alpha} \\ d_{a_2 \to a_X} \cdot P_{a_2 \to a_\alpha} \\ d_{a_3 \to a_X} \cdot P_{a_3 \to a_\alpha} \\ \vdots \\ d_{a_n \to a_X} \cdot P_{a_n \to a_\alpha} \end{bmatrix}}_{\lambda_{a_x} \odot \pi_{a_\alpha}}$$

*FIG. 7*

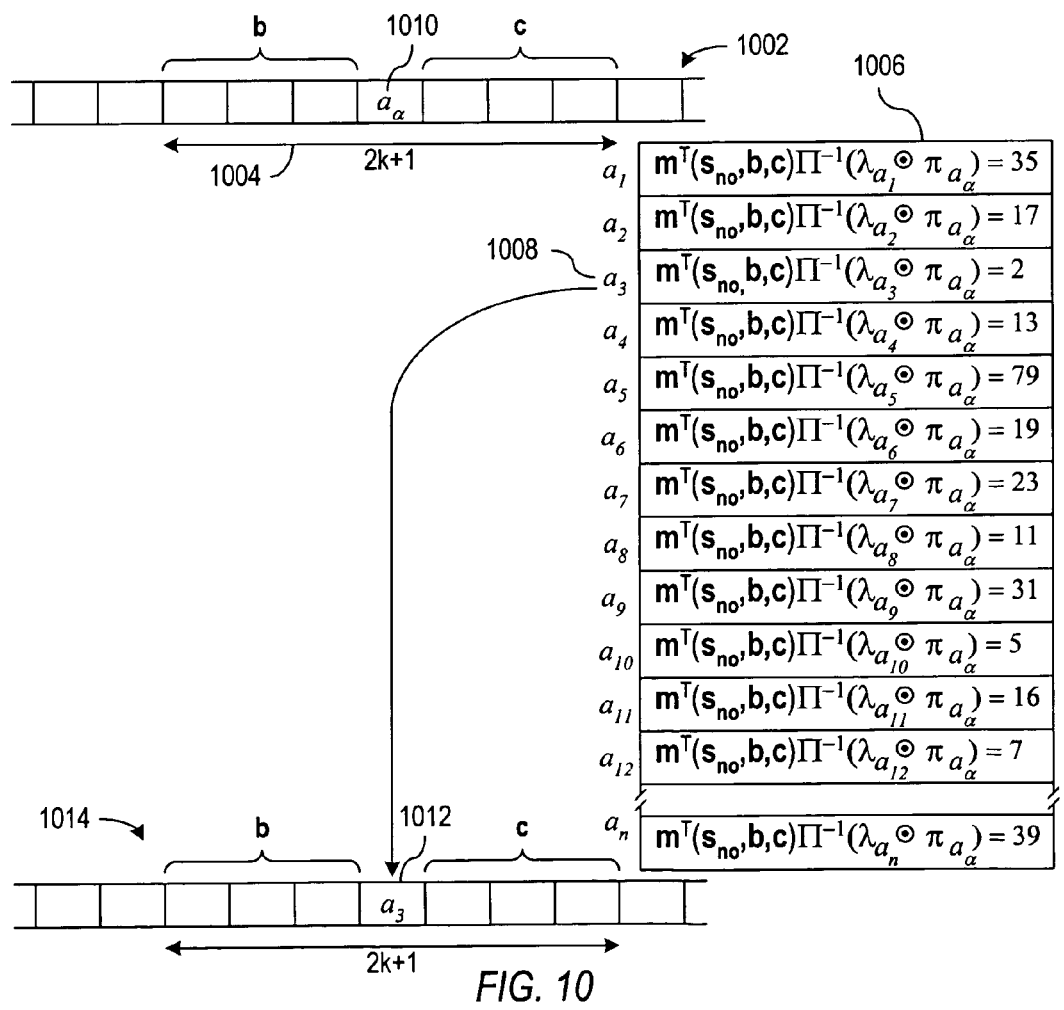

1100

| 0 | 2 | 4 | 6 | 8 | 10 | 12 | 14 | 16 | 18 | 20 | 22 |
|---|---|---|---|---|---|---|---|---|---|---|---|
| 2 | 4 | 255 | 8 | 10 | 12 | 14 | 16 | 18 | 20 | 22 | 24 |
| 4 | 6 | 8 | 10 | 12 | 14 | 0 | 18 | 20 | 22 | 24 | 26 |
| 6 | 8 | 10 | 12 | 14 | 16 | 18 | 20 | 22 | 24 | 26 | 28 |
| 8 | 10 | 73 | 133 | 134 | 78 | 20 | 22 | 24 | 26 | 28 | 30 |
| 10 | 12 | 133 | 255 | 255 | 138 | 22 | 24 | 255 | 28 | 30 | 32 |
| 12 | 14 | 134 | 255 | 255 | 139 | 24 | 26 | 28 | 30 | 32 | 0 |
| 14 | 16 | 78 | 138 | 139 | 82 | 26 | 28 | 30 | 32 | 34 | 36 |
| 16 | 18 | 20 | 22 | 24 | 26 | 28 | 30 | 32 | 34 | 255 | 38 |
| 18 | 20 | 22 | 24 | 0 | 28 | 30 | 255 | 34 | 36 | 38 | 40 |
| 20 | 22 | 24 | 26 | 28 | 30 | 32 | 0 | 36 | 38 | 40 | 42 |
| 22 | 24 | 26 | 28 | 30 | 32 | 34 | 36 | 38 | 40 | 42 | 44 |

1121, 1123, 1122, 1110

$$\begin{pmatrix}20\\22\\24\\22\\26\\24\\26\\28\end{pmatrix} - \begin{pmatrix}24\\24\\24\\24\\24\\24\\24\\24\end{pmatrix} = \begin{pmatrix}-4\\-2\\0\\-2\\2\\0\\2\\4\end{pmatrix} \qquad \begin{pmatrix}32\\34\\36\\34\\38\\36\\38\\40\end{pmatrix} - \begin{pmatrix}36\\36\\36\\36\\36\\36\\36\\36\end{pmatrix} = \begin{pmatrix}-4\\-2\\0\\-2\\2\\0\\2\\4\end{pmatrix}$$

$\eta_1 - \overline{\eta_1} = \Delta\eta_1 \rightarrow Q(\Delta\eta_1) = C(\eta_1)$ 　　　 $\eta_2 - \overline{\eta_2} = \Delta\eta_2 \rightarrow Q(\Delta\eta_2) = C(\eta_2)$ $$\begin{pmatrix}8\\10\\73\\10\\133\\12\\14\\134\end{pmatrix} - \begin{pmatrix}49.25\\49.25\\49.25\\49.25\\49.25\\49.25\\49.25\\49.25\end{pmatrix} = \begin{pmatrix}-41.25\\-39.25\\23.75\\-39.25\\83.75\\-37.25\\-35.25\\84.75\end{pmatrix} \xrightarrow{\text{QUANTIZATION}} \begin{pmatrix}-40\\-40\\24\\-40\\80\\-40\\-32\\80\end{pmatrix}$$

$\eta_3 - \overline{\eta_3} = \Delta\eta_3 \longrightarrow Q(\Delta\eta_3) = C(\eta_3)$

*FIG. 11*

CONTEXT-BASED DENOISER THAT SIMULTANEOUSLY UPDATES PROBABILITIES FOR MULTIPLE CONTEXTS

CROSS-REFERENCE TO RELATED APPLICATIONS

This patent document claims benefit of the earlier filing date of U.S. provisional patent application No. 60/611,169, filed Sep. 14, 2004, which is hereby incorporated by reference in its entirety.

BACKGROUND

A large body of mathematical and computational techniques has been developed in the area of reliable signal transmission through noise-introducing channels. These different techniques depend on assumptions made with regard to the noise-introducing channel, as well as on the amount and nature of information available, during denoising, regarding the original signal. The denoising process may be characterized by various computational efficiencies, including the time complexity and working-data-set complexity for a particular computational method, as well as by the amount of distortion, or noise, remaining in a recovered signal following denoising with respect to the originally transmitted, clean signal. Although methods and systems for denoising noisy signals have been extensively studied, and signal denoising is a relatively mature field, developers, vendors, and users of denoising methods and systems, and of products that rely on denoising, continue to recognize the need for improved denoising techniques.

SUMMARY

In accordance with an aspect of the invention, a discrete, universal denoising method is applied to data signals having a known type such as data representing continuous tone images. The method exploits a priori information regarding the data when statistically evaluating a noisy signal. In particular, using characteristics such as continuity and small-scale symmetry allows identification of symbols and contexts that have similar statistical properties in the noisy or clean data. As a result, the occurrence of a symbol in one context in the noisy signal can be used to update the statistics for a large number of symbols/contexts having similar statistical characteristics. Statistical evaluation of a noisy signal is thus improved permitting improvement in denoising when the available data is limited.

BRIEF DESCRIPTION OF THE DRAWINGS

FIGS. 2A, 2B, 2C, and 2D illustrate a motivation for a discrete, universal denoiser related to characteristics of the noise-introducing channel.

FIGS. 5A, 5B, 5C, and 5D illustrate the concept of symbol-corruption-related distortion in a noisy or recovered signal.

FIG. 6 displays one form of a symbol-transformation distortion matrix $\Lambda$.

FIG. 7 illustrates computation of the relative distortion expected from replacing a symbol "$a_\alpha$" in a received, noisy signal by the symbol "$a_x$."

FIG. 8 illustrates use of the column vector to compute a distortion expected for replacing the center symbol $a_\alpha$ in the metasymbol $ba_\alpha c$ in a noisy signal "$s_{no}$" by the replacement symbol $a_x$.

FIG. 9 shows estimation of the counts of the occurrences of symbols "$a_1$" to "$a_n$" for the clean signal.

FIG. 10 illustrates the process by which a discrete, universal denoiser denoises a noisy signal.

FIG. 11 illustrates an embodiment of the invention that determines difference contexts and context classes when denoising a continuous tone image.

Use of the same reference symbols in different figures indicates similar or identical items.

DETAILED DESCRIPTION

Embodiments of the present invention are related to denoising methods and systems in general and to discrete, universal denoising systems and methods for data such as continuous tone images, audio data, and financial data where neighboring data tends to be related in a manner that suggests continuity. A general discrete, universal denoising method, referred to as "DUDE," is described, below, in a first section. A second section describes exemplary embodiments of the present invention applied to denoising data signals in which different contexts for symbols can provide information regarding the characteristics of other contexts. A third section describes use of DUDE with rough or iterative denoising for improved modeling, and the fourth section describes exemplary channel inversion processes for some types of noise-introducing channels.

DUDE (or Discrete Universal DEnoising)

Figure 1:
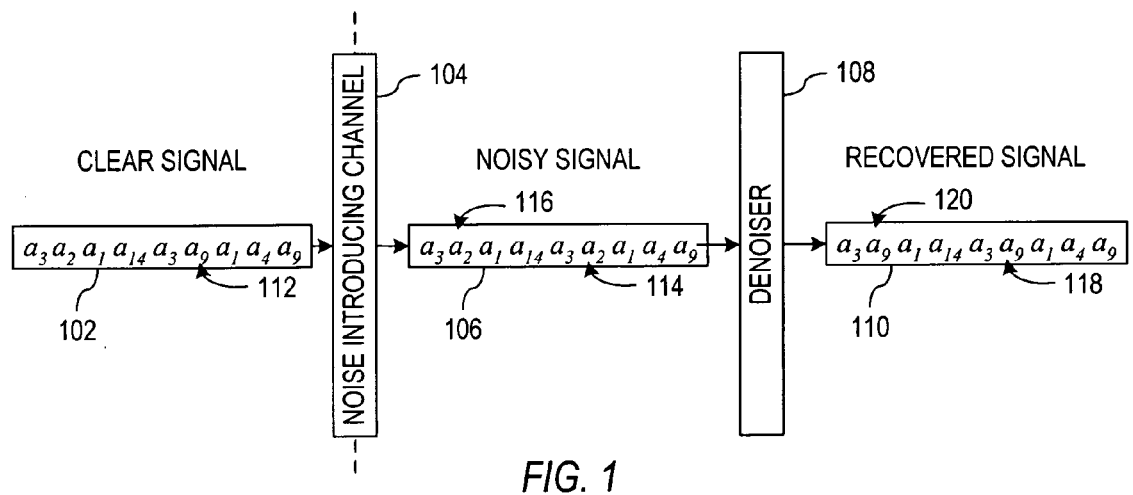
FIG. 1 illustrates introduction of noise into a clean signal to produce a noisy signal and subsequent denoising of the noisy signal to produce a recovered signal.

FIG. 1 illustrates introduction of noise into a clean signal 102 to produce a noisy signal 106 and subsequent denoising of noisy signal 106 to produce a recovered signal 110. For an illustrative example, signals 102, 106, and 110 are treated as linear, ordered sequences of symbols, such as a stream of alphanumeric characters that comprise a text file, but the data into which noise can be introduced include two-dimensional images, audio signals, video signals, and other types of displayed and broadcast information. In FIG. 1, signals 102, 106, 110 are represented as sequences of symbols that are each members of an alphabet A having n distinct symbols, where A is $\{a_1, a_2, a_3, \ldots a_n\}$. Note that the subscripts of the symbols refer to the positions of the respective symbols within an ordered list of the symbols of the alphabet, and not to the positions of symbols in a signal. In FIG. 1, an initial, clean signal 102 comprises an ordered sequence of nine symbols from the alphabet A. In normal circumstances, an input signal may have thousands, millions, or more symbols. Input signal 102 is short for illustrative convenience.

Clean signal 102 is transmitted or passed through a noise-introducing channel 104, producing noisy signal 106. In the example shown in FIG. 1, noisy signal 106 includes symbols from the same alphabet A as input signal 102, although, in general, the input symbols may be chosen from a different, equally sized or smaller alphabet than that from which the output symbols are selected. In the example shown in FIG. 1, noise-introducing channel 104 alters a symbol 112 having value $a_9$ in the clean signal 102 to produce a corresponding symbol 114 having $a_2$ in the noisy signal 106.

There are many different types of noise-introducing channels, each type characterized by the types and magnitudes of noise that the noise-introducing channel introduces into a clean signal. Examples of noise-introducing channels include electronic communications media, data storage devices to which information is transferred and from which information is extracted, and transmission and reception of radio and television signals. In order to achieve reasonable fidelity for display, broadcast, or storage of a signal transmitted through a noise-introducing channel, a denoising process may be undertaken to remove noise that the noise-introducing channel introduced. In FIG. 1, noisy signal 106 is passed through or processed by a denoiser 108 to produce recovered signal 110, which, when the denoising process is effective, is substantially closer to, or more perceptually similar to, the originally transmitted clean signal 102 than to the received noisy signal 106.

Many types of denoisers have been proposed, studied, and implemented. Some involve application of continuous mathematics, some involve detailed knowledge of the statistical properties of the originally transmitted clean signal, and some rely on detailed information concerning time and sequence-dependent behavior of the noise-introducing channel. The following discussion describes a discrete, universal denoiser, referred to as "DUDE." The DUDE is discrete in the sense that the DUDE processes signals comprising discrete symbols using a discrete algorithm, rather than continuous mathematics. The DUDE is universal in that it asymptotically approaches the performance of an optimum denoiser employing knowledge of the clean-signal symbol-occurrence distributions without access to these distributions.

A particular noise-introducing-channel model and a number of assumptions are generally employed in a DUDE implementation. These are discussed below. However, DUDE may effectively function when the model and assumptions do not, in fact, correspond to the particular characteristics and nature of a noise-introducing channel. Thus, the model and assumptions motivate the DUDE approach, but the DUDE has a much greater range of effectiveness and applicability than merely to denoising signals corrupted by a noise-introducing channel corresponding to the motivating model and assumptions.

In the DUDE, denoiser 108 of FIG. 1 employs a strategy for denoising noisy signal 106 that considers the context of each symbol. When the noisy signal is a linear sequence of symbols, the context generally comprising one or more symbols preceding and following the symbol according to a left to right ordering. For example, in FIG. 1, the two occurrences of the symbol "$a_2$" in the noisy signal 106 occur within the same single preceding-and-following-symbol context. The context for two occurrences 114 and 116 of the symbol "$a_2$" in noisy signal 106 of the example in FIG. 1 is ["$a_3$," "$a_1$"]. Denoiser 108 either leaves all symbols of a particular type "$a_i$" within a particular context unchanged, or changes all occurrences of a particular type of symbol "$a_i$" within a particular context to a different symbol "$a_j$." For example, denoiser 108 replaced all occurrences 114 and 116 of the symbol "$a_2$" in noisy signal 106 within the full context ["$a_3$," "$a_1$"] with occurrences 118 and 120 of the symbol "$a_9$" in recovered signal 110. Thus, denoiser 108 does not necessarily produce a recovered signal identical to the originally transmitted clean signal 102, but instead produces a denoised, recovered signal 110 estimated to have less distortion with respect to clean signal 102 than does noisy signal 106. In the above example, replacement of the second symbol "$a_2$" at position 114 with the symbol "$a_9$" restores the originally transmitted symbol at that position, but replacement of occurrence 116 of symbol "$a_2$" in noisy signal 106 with the symbol "$a_9$" introduces a new distortion. Denoiser 108 only replaces one symbol with another to produce recovered signal 110 when denoiser 108 estimates that the overall distortion of recovered signal 110 with respect to clean signal 102 will be less than the distortion of noisy signal 106 with respect to clean signal 102.

Figure 2A:
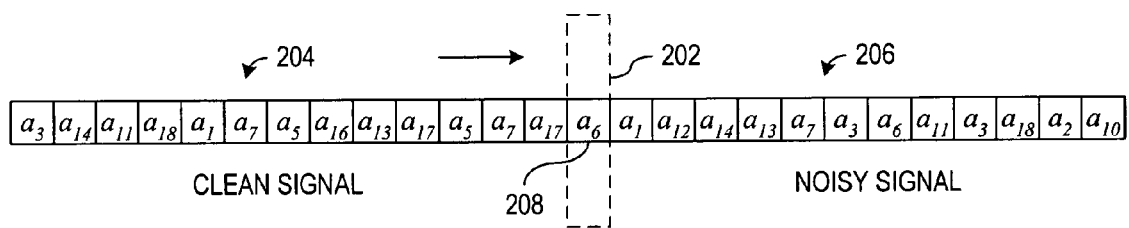

FIGS. 2A to 2D illustrate a motivation for DUDE related to characteristics of the noise-introducing channel. DUDE assumes a memory-less channel. In other words, as shown in FIG. 2A, the noise-introducing channel 202 may be considered to act as a one-symbol window, or aperture, through which a clean signal 204 passes. The noise-introducing channel 202 corrupts a target clean-signal symbol by replacing the target symbol with another symbol in a noisy signal 206, with an estimateable probability that depends neither on the history of symbols preceding the target symbol through noise-introducing channel 202 nor on the symbols that are subsequently transmitted through noise-introducing channel 202.

Figure 2B:
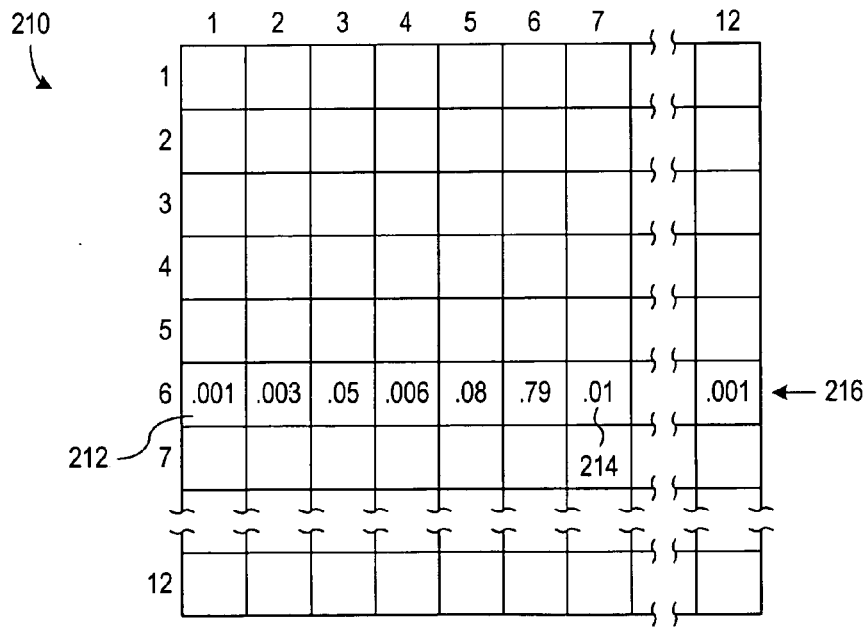

FIG. 2B shows a portion of a table 210 that stores the probabilities that any particular symbol from the alphabet A, "$a_i$," may be corrupted to a symbol "$a_j$" during transmission through the noise-introducing channel. For example, in FIG. 2A, symbol 208 having clean value "$a_6$" is passing through noise-introducing channel 202. Row 216 in table 210 contains the probabilities that symbol "$a_6$" will be corrupted to each of the different, possible symbols in the alphabet A. For example, the probability 212 that the symbol "$a_6$" will be changed to the symbol "$a_1$" appears in the first cell of row 216 in table 210, indexed by the integers "6" and "1" corresponding to the positions of symbols "$a_6$" and "$a_1$" in the alphabet A. The probability 214 that symbol "$a_6$" will be faithfully transferred, without corruption, through noise-introducing channel 202 appears in the table cell with indices (6, 6). Note that the sum of the probabilities in each row of the table 210 is 1.0, since the noise-introducing channel will transmit a given symbol either faithfully or as some other symbol in an output alphabet A.

As shown in FIG. 2C, table 210 of FIG. 2B can be alternatively expressed as a two-dimensional matrix Π, with the matrix element identified by indices (i, j) indicating the probability that the noise-introducing channel will transmit symbol "$a_i$" as symbol "$a_j$." Note also that a column j in matrix Π may be referred to as a vector "$\pi_j$" or $\pi_{a_j}$.

As shown in FIG. 2D, a row vector 218 containing counts $m_C$ of the number of each type of symbol in the clean signal, where, for example, the number of occurrences of the symbol "$a_5$" in the clean signal appears in the row vector as $m_C[a_5]$, can be multiplied by the symbol-transition-probability matrix Π to approximate a row vector 222 containing the actual occurrence counts $m_N[a_i]$ for each of the symbols as in the noisy signal 206. The actual occurrence counts of symbols "$a_i$" in the noisy signal appear in the row vector $m_N$. The matrix multiplication is shown in expanded form 224 below the matrix multiplication in FIG. 2D. Thus, in vector notation: $m_C \cdot \Pi \cong m_N$, where $m_C$ is a row vector containing the occurrence counts of each symbol $a_i$ in the alphabet in the clean signal; and $m_N$ is a row vector containing the occurrence counts of each symbol $a_i$ in the alphabet in the noisy signal.

The approximation symbol ≅ is employed in the equation $m_C \cdot \Pi \cong m_N$, because the probabilities in matrix Π give only the expected frequency of a particular symbol substitution, while the actual symbol substitution effected by the noise-introducing channel is random. In other words, the noise-introducing channel behaves randomly, rather than deterministically, and thus may produce different results each time a particular clean signal is transmitted through the noise-introducing channel. The error in the approximation, obtained as the sum of the absolute values of the components of the difference between the left and right sides of the approximation, above, is generally small relative to the sequence length, on the order of the square root of the sequence length. Multiplying, from the right, both sides of the above equation by the inverse $\Pi^{-1}$ of matrix Π, assuming that Π is invertible, allows for calculation of an estimated row-vector count of the symbols in the clean signal $\hat{m}_c$, from the counts of the symbols in the noisy signal, as follows: $\hat{m}_c \cong m_N \cdot \Pi^{-1}$. In the case where the noisy symbol alphabet is larger than the clean symbol alphabet, it is assumed that matrix Π is full-row-rank and the inverse $\Pi^{-1}$ in the above expression can be replaced by a generalized inverse, such as the Moore-Penrose generalized inverse.

As will be described below, the DUDE applies clean symbol count estimation on a per-context basis to obtain estimated counts of clean symbols occurring in particular noisy symbol contexts. The actual denoising of a noisy symbol is then determined from the noisy symbol's value, the resulting estimated context-dependent clean symbol counts, and a loss or distortion measure, in a manner described below.

As discussed above, the DUDE considers each symbol in a noisy signal within a context. In a 1-dimensional signal such as that used for the example of FIG. 1, the context may be the values of a number of symbols preceding, following, or both preceding and following a currently considered symbol. In 2-dimensional or higher dimensional signals, the context may be values of symbols in any of an almost limitless number of different types of neighborhoods surrounding a particular symbol. For example, in a 2-dimensional image, the context may be the eight pixel values surrounding a particular, interior pixel. For the description provided in this section, a 1-dimensional signal is used for examples, but the DUDE can effectively denoise higher dimensional signals such as data signals representing images.

Figure 3A:
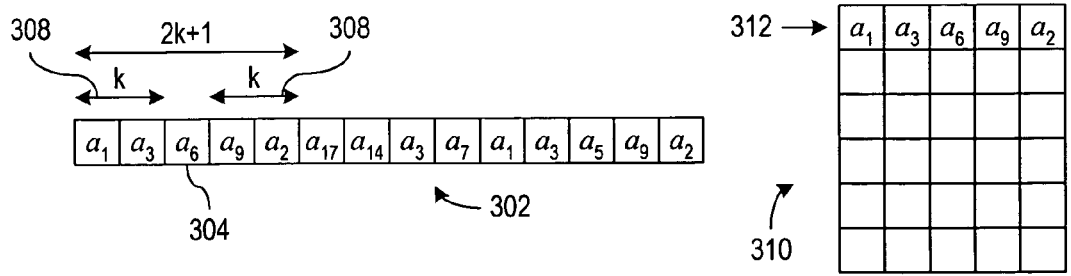
FIGS. 3A, 3B, 3C, and 3D illustrate a context-based, sliding window approach by which a discrete, universal denoiser characterizes the occurrences of symbols in a noisy signal.

In order to consider occurrences of symbols within contexts in the 1-dimensional-signal case, the DUDE needs to consider a number of symbols adjacent to each considered symbol. FIGS. 3A to 3D illustrate a context-based, sliding window approach by which the DUDE characterizes the occurrences of symbols in a noisy signal. FIGS. 3A to 3D all employ the same illustration conventions, which are described only for FIG. 3A, in the interest of brevity. In FIG. 3A, the DUDE analyzes a noisy signal 302 in order to determine the occurrence counts of particular symbols within particular contexts within noisy signal 302. The DUDE employs a constant k to describe the length of a sequence of symbols preceding, and the length of a sequence of symbols subsequent to, a particular symbol that, together with the particular symbol, may be viewed as a metasymbol of length 2k+1. In the example of FIGS. 3A to 3D, k has the value "2." Thus, a symbol preceded by a pair of symbols and succeeded by a pair of symbols can be viewed as a five-symbol metasymbol. In FIG. 3A, the symbol "$a_6$" in position 304 occurs within a context of the succeeding k-length symbol string "$a_9 a_2$" in positions 306 and is preceded by the two-symbol string "$a_1 a_3$" in positions 308. The symbol "$a_6$" therefore occurs at least once in noisy signal 302 within the context ["$a_1 a_3$," "$a_9 a_2$"], or, equivalently, the metasymbol "$a_1 a_3 a_6 a_9 a_2$" occurs at least once in noisy signal 302. The occurrence of this metasymbol within noisy signal 302 is listed within a table 310 as the first five-symbol metasymbol 312.

Figure 3B:
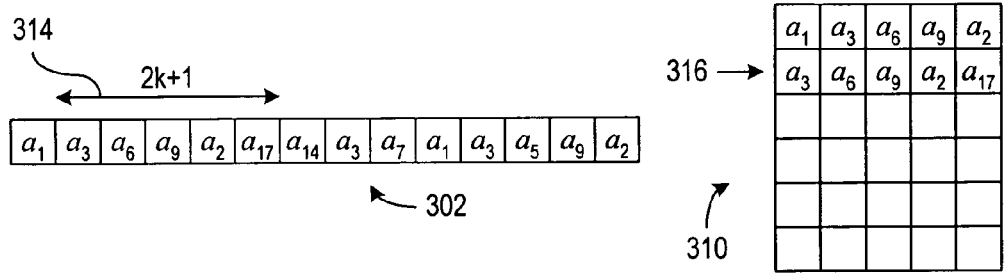
Figure 3C:
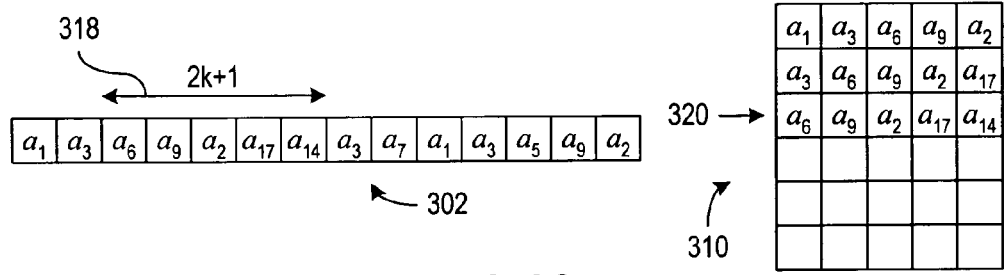
Figure 3D:
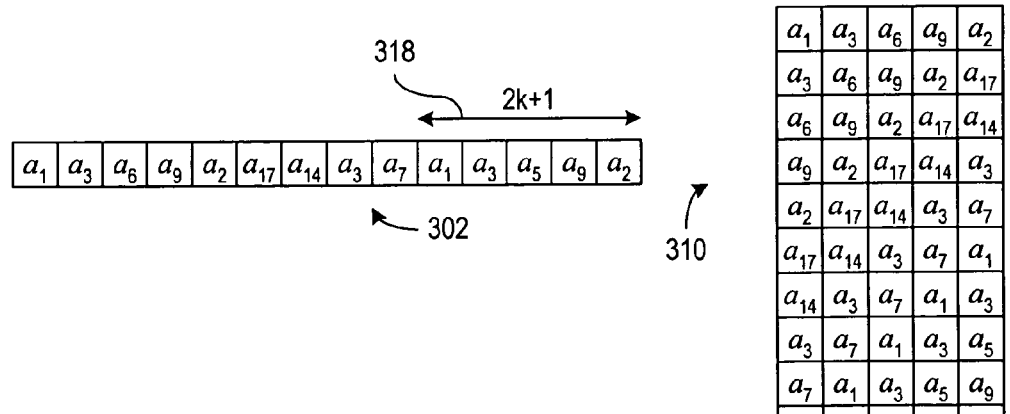

As shown in FIG. 3B, DUDE then slides the window of length 2k+1 rightward, by one symbol, to consider a second metasymbol 314 of length 2k+1. In this second metasymbol, the symbol "$a_9$" appears within the context ["$a_3 a_6$," "$a_2 a_{17}$"]. This second metasymbol 314 is entered into table 310 as a second entry 316. FIG. 3C shows detection of a third metasymbol 318 in noisy signal 302 and entry of a third metasymbol into table 310 as entry 320. FIG. 3D shows the table 310 after DUDE completes analysis of short noisy signal 302. Although, in the examples shown in FIG. 3D, DUDE lists each metasymbol as a separate entry in the table, in a more efficient implementation, DUDE enters each detected metasymbol only once in an index table, and increments an occurrence count each time the metasymbol is subsequently detected. In this fashion, in a first pass, DUDE tabulates the frequency of occurrence of metasymbols within the noisy signal or, viewed differently, DUDE tabulates the occurrence frequency of symbols within contexts comprising k preceding and k subsequent symbols surrounding each symbol.

Figure 4:
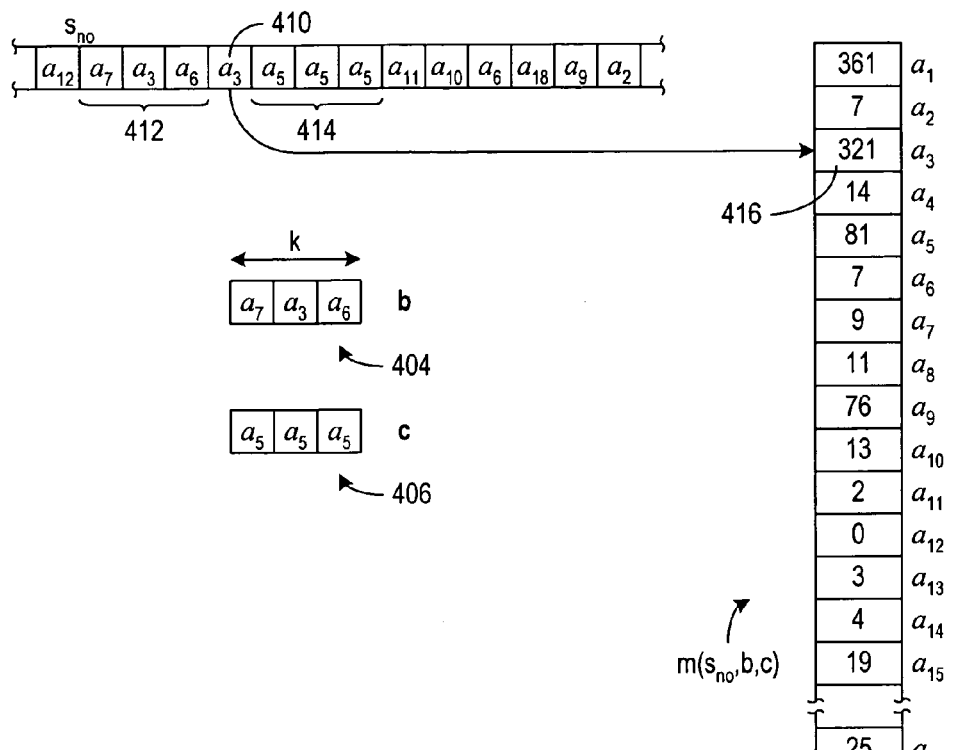
FIG. 4 illustrates a convenient mathematical notation and data structure representing a portion of the metasymbol table constructed by a discrete, universal denoiser, as described with reference to FIGS. 3A to 3D.

FIG. 4 illustrates a convenient mathematical notation and data structure representing a portion of the metasymbol table constructed by DUDE, as described with reference to FIGS. 3A to 3D. A column vector $m(s_{no}, b, c)$ in FIG. 4 represents counts of the occurrences of each symbol in the alphabet A within a particular context, represented by the k-length symbol vectors b and c, within a noisy signal $s_{no}$, where 1-dimensional noisy signal $s_{no}$ is viewed as a vector. As will be understood by those of skill in the art, the counts in vector $m(s_{no}, b, c)$ may be normalized if desired to produce probabilities. In FIG. 4, for example, the context value for which the occurrence counts are tabulated in column vector $m(s_{no}, b, c)$ comprises a symbol vector 404 and a symbol vector 406, where k has the value 3. In noisy signal $s_{no}$ of FIG. 4, the symbol "$a_3$" in position 410 occurs within the context comprising three symbols 412 to the left of position 410 and three symbols 414 to the right of the position 410. This particular context has a value equal to the combined values of symbol vectors 404 and 406, denoted ["$a_7a_3a_6$," "$a_5a_5a_5$"] and this occurrence of the symbol "$a_3$" 410 within the context ["$a_7a_3a_6$," "$a_5a_5a_5$"], along with all other occurrences of the symbol "$a_3$" in the context ["$a_7a_3a_6$," "$a_5a_5a_5$"], is noted by a count 416 within the column vector m($s_{no}$,b,c), with vector [b,c] equal to ["$a_7a_3a_6$," "$a_5a_5a_5$"]. In other words, a symbol "$a_3$" occurs within the context ["$a_7a_3a_6$," "$a_5a_5a_5$"] in the noisy signal $s_{no}$ 321 times in the example of FIG. 4. The counts for the occurrences of all other symbols "$a_1$", "$a_2$", and "$a_4$"-"$a_n$" in the context ["$a_7a_3a_6$," "$a_5a_5a_5$"] within noisy signal $s_{no}$ are recorded in successive elements of the column vector m($s_{no}$, "$a_7a_3a_6$", "$a_5a_5a_5$"). An individual count within a column vector m($s_{no}$, b, c) can be referred to using an array-like notation. For example, the count of the number of times that the symbol "$a_3$" appears in the context ["$a_7a_3a_6$," "$a_5a_5a_5$"] within the noisy signal $S_{no}$, 321, can be referred to as m($s_{no}$, "$a_7a_3a_6$", "$a_5a_5a_5$")[$a_3$].

DUDE employs either a full or a partial set of column vectors for all detected contexts of a fixed length 2k in the noisy signal in order to denoise the noisy signal. Note that an initial set of symbols at the beginning and end of the noisy signal of length k are not counted in any column vector m($s_{no}$, b, c) because they lack either sufficient preceding or subsequent symbols to form a metasymbol of length 2k+1. However, as the length of the noisy signal for practical applications tends to be quite large and the context length k tends to be relatively small, DUDE's failure to consider the first and final k symbols with respect to their occurrence within contexts makes almost no practical different in the outcome of the denoising operation.

Figures 5A, 5B:
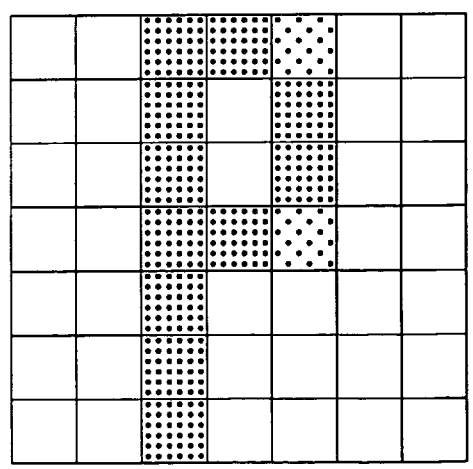

FIGS. 5A to 5D illustrate the concept of symbol-corruption-related distortion in a noisy or recovered signal. The example of FIGS. 5A to 5D relates to a 256-value grayscale image of a letter. In FIG. 5A, the grayscale values for cells, or pixels, within a two-dimensional image 502 are shown, with the character portions of the symbol generally having a minimum grayscale value of 0 and the background pixels having a maximum grayscale value of 255, using a convention that the displayed brightness of the pixel increases with increasing numerical value. Visual display of the image represented by the two-dimensional grayscale signal in FIG. 5A is shown in FIG. 5B. The grayscale data in FIG. 5A is meant to represent a low resolution image of the letter "P." As shown in FIG. 5B, the image of the letter "P" is reasonably distinct, with reasonably high contrast.

FIG. 5C shows the grayscale data with noise introduced by transmission through a hypothetical noise-introducing channel. Comparison of FIG. 5C to FIG. 5A shows that there is marked difference between the grayscale values of certain cells, such as cell 506 before and after transmission. FIG. 5D shows a display of the grayscale data from FIG. 5C. The displayed image is not easily recognizable as the letter "P." In particular, two cells contribute greatly to the distortion: (1) cell 506, changed in transmission from the grayscale value "255" to the grayscale value "31"; and (2) cell 508, changed in transmission from the grayscale value "0" to the grayscale value "239." Other noise, such as the relatively small magnitude grayscale changes of cells 510 and 512, introduces relatively little distortion and would have not seriously impacted recognition of the letter "P." In this case, the distortion of the displayed image contributed by noise introduced into the grayscale data appears to be proportional to the magnitude of change in the grayscale value. Thus, the distorting effects of noise within symbols of a signal are not necessarily uniform. A noise-induced change of a transmitted symbol to a closely related, received symbol may produce far less distortion than a noise-induced change of a transmitted symbol to a very different, received symbol.

The DUDE uses a symbol-transformation matrix Λ to model the non-uniform distortion effects of particular noise-induced symbol transitions. FIG. 6 displays one form of the symbol-transformation distortion matrix Λ. An element $d_{a_i \rightarrow a_j}$ of the matrix Λ provides the relative distortion incurred by substituting the symbol "$a_j$" in the noisy or recovered signal for the symbol "$a_i$" in the clean signal. An individual column j of the matrix Λ may be referred to as a vector $\lambda_j$ or $\lambda_{a_j}$.

FIG. 7 illustrates computation of the relative distortion, with respect to the clean signal, expected from replacing a symbol "$a_\alpha$" in a received, noisy signal by the symbol "$a_x$." As shown in FIG. 7, element-by-element multiplication of the elements of the column vectors $\lambda_{a_x}$ and $\pi_{a_\alpha}$, an operation known as the Schur product of two vectors, and designated in the current discussion by the symbol ⊙, produces a column vector $\lambda_{a_x} \odot \pi_{a_\alpha}$ in which the i-th element is the product $d_{a_i \rightarrow a_x} p_{a_i \rightarrow a_\alpha}$ of a distortion and a probability reflective of the relative distortion expected in the recovered signal by replacing the symbol $a_\alpha$ in the noisy symbol by the symbol "$a_x$" when the symbol in the originally transmitted, clean signal is "$a_i$."

FIG. 8 illustrates use of column vector $\lambda_{a_x} \odot \pi_{a_\alpha}$ to compute a distortion expected for replacing "$a_\alpha$" in the metasymbol $ba_\alpha c$ in a noisy signal $s_{no}$ by the replacement symbol "$a_x$". In the following expression, and in subsequent expressions, the vectors $s_{no}$ and $s_{cl}$ respectively denote noisy and clean signals. A different column vector q can be defined to represent the occurrence counts for all symbols in the clean signal that appear at locations in the clean signal $s_{cl}$ that correspond to locations in the noisy signal $s_{no}$ around which a particular context [b, c] occurs. An element of the column vector q is defined in Equation 1, where $s_{cl}[i]$ and $s_{no}[i]$ denote the symbols at location i in the clean and noisy signals, respectively; and $a_\alpha$ is a symbol in the alphabet A.

$$q(s_{no}, s_{cl}, b,c)[a_\alpha] = |\{i : s_{cl}[i] = a_\alpha, (s_{no}[i-k],$$
$$s_{no}[i-k+1], \ldots, s_{no}[i-1]) = b, (s_{no}[i+1],$$
$$s_{no}[i+2], \ldots, s_{no}[i+k]) = c\}|, \quad \text{Equation 1:}$$

The column vector q($s_{no}$,$s_{cl}$,b,c) includes n elements with indices $a_\alpha$ from "$a_1$" to "$a_n$," where n is the size of the symbol alphabet A. Note that the column vector q($s_{no}$,$s_{cl}$,b,c) is, in general, not obtainable, because the clean signal, upon which the definition depends, is unavailable. Multiplication of the transpose $q^T(s_{no},s_{cl},b,c)$ of the column vector q($s_{no}$, $s_{cl}$,b,c) by the column vector $\lambda_{a_x} \odot \pi_{a_\alpha}$ produces the sum of the expected distortions in the column vector times the occurrence counts in the row vector that together provide a total expected distortion for replacing "$a_\alpha$" in the metasymbol $ba_\alpha c$ in signal $s_{no}$ by "$a_x$". For example, the first term in the sum is produced by multiplication of the first elements in the row vector by the first element in the column vector, resulting in the first term in the sum being equal to $q^T(s_{no}, s_{cl},b,c)[a_1](p_{a_1 \rightarrow a_\alpha} d_{a_1 \rightarrow a_x})$ or, in other words, a contribution to the total distortion expected from replacing "$a_\alpha$" with "$a_x$" in all occurrences of $ba_\alpha c$ in signal $s_{no}$ when the corresponding symbol in signal $s_{cl}$ is $a_1$. The full sum gives the full expected distortion:

$$q^T(s_{no},s_{cl},b,c)[a_1](p_{a_1 \rightarrow a_\alpha} d_{a_1 \rightarrow a_x}) + q^T(s_{no},s_{cl},b,c)[a_2]$$
$$(p_{a_2 \rightarrow a_\alpha} d_{a_2 \rightarrow a_x}) + q^T(s_{no},s_{cl},b,c)[a_3](p_{a_3 \rightarrow a_\alpha}$$
$$d_{a_3 \rightarrow a_x}) + \ldots + q^T(s_{no},s_{cl},b,c)[a_n](p_{a_n \rightarrow a_\alpha} d_{a_n \rightarrow a_x})$$

As discussed above, DUDE does not have the advantage of knowing the clean signal input to the noise-introducing channel that produced the received noisy signal. Therefore, DUDE estimates the occurrence counts, $q^T(s_{no},s_{cl},b,c)$, of symbols in the originally transmitted, clean signal, by multiplying the row vector $m^T(s_{no},b,c)$ by $\Pi^{-1}$ from the right. FIG. 9 shows estimations of the counts of the occurrences of symbols "$a_1$" to "$a_n$" for the clean signal.

The resulting expression $m^T(s_{no},b,c)\Pi^{-1}(\lambda_{a_x} \odot \pi_{a_\alpha})$ obtained by substituting $m^T(s_{no},b,c) \Pi^{-1}$ for $q^T(s_{no},s_{cl},b,c)$ represents the DUDE's estimation of the distortion, with respect to the originally transmitted clean signal, produced by substituting "$a_x$" for the symbol "$a_\alpha$" within the context [b, c] in the noisy signal $s_{no}$. DUDE denoises the noisy signal by replacing "$a_\alpha$" in each occurrence of the metasymbol $ba_\alpha c$ by that symbol "$a_x$" providing the least estimated distortion of the recovered signal with respect to the originally transmitted, clean signal, using the above expression. In other words, for each metasymbol $ba_\alpha c$, DUDE employs the transfer function $g^k(b,a_\alpha,c)$ of Equation 2 to determine how to replace the central symbol $a_\alpha$. In some cases, the minimum distortion is produced by no substitution or, in other words, by the substitution $a_x$ equal to $a_\alpha$.

Equation 2:

$$g^k(b, a_\alpha, c) = \underset{a_x=a_1 \text{ to } a_n}{\operatorname{argmin}} \left[ m^T(s_{no}, b, c) \prod^{-1} (\lambda_{a_x} \odot \pi_{a_\alpha}) \right]$$

FIG. 10 illustrates the process by which DUDE denoises a noisy, received signal. First, as discussed above, DUDE compiles counts for all or a portion of the metasymbols comprising each possible symbol "$a_i$" within each possible context [b, c]. As discussed above, the counts are stored in column vectors $m(s_{no},b,c)$. In the next pass, DUDE again passes a sliding window over a noisy signal 1002. For each metasymbol, such as metasymbol 1004, DUDE determines the relative distortions of the recovered signal with respect to the clean signal that would be produced by substituting for the central character "$a_\alpha$" of the metasymbol each possible replacement symbol "$a_i$" in the range i=1 to n. These relative distortions are shown in table 1006 in FIG. 10 for metasymbol 1004 detected in noisy signal 1002. Examining the relative distortion table 1006, DUDE selects the replacement symbol with the lowest relative distortion, or, in the case that two or more symbols produce the same relative distortions, selects the first of the multiple replacement symbols with the lowest estimated distortion. In the example shown in FIG. 10, that symbol 1008 is "$a_3$". DUDE then replaces the central symbol "$a_\alpha$" at position 1010 in noisy signal 1002 with the selected replacement symbol "$a_3$" at the corresponding position 1012 in the recovered signal 1014. Note that recovered signal 1014 is generated from independent considerations of each type of metasymbol in noisy signal 1002, so that the replacement symbol selected in a previous step does not affect the choice for a replacement symbol in a next step for a different metasymbol. In other words, the replacement signals are generated in parallel, rather than after substitution of symbols directly into the noisy signal. As with any general method, the above-described method by which DUDE denoises a noisy signal can be implemented using various data structures, indexing techniques, and algorithms to produce a denoising method that has both linear time and linear working-data-set complexities or, in other words, the time complexity is related to the length of the received, noisy signal, by multiplication by a constant, as is the working-data-set complexity.

The examples employed in the above discussion of DUDE are primarily 1-dimensional signals. However, as also discussed above, DUDE may also denoise 2-dimensional and multi-dimensional signals. In the 2-and-multi-dimensional cases, rather than considering symbols within a 1-dimensional context, symbols may be considered within a contextual neighborhood. For example, the pixels adjacent to a currently considered pixel in a 2-dimensional image may together comprise the contextual neighborhood for the currently considered symbol, or, equivalently, the values of a currently considered pixel and adjacent pixels may together comprise a 2-dimensional metasymbol. In a more general treatment, the expression $m^T(s_{no},b,c)\Pi^{-1}(\lambda_{a_x} \odot \pi_{a_\alpha})$ may be replaced by the more general expression $m^T(s_{no},\eta)\Pi^{-1}(\lambda_{a_x} \odot \pi_{a_\alpha})$ where components of the vector $\eta$ are the symbol values in a particular contextual neighborhood.

The neighborhood may more generally be defined according to various criteria, including proximity in time, proximity in display or representation, or according to any arbitrary, computable metric, and may have various different types of symmetry. For example, in the above-discussed 1-dimensional-signal examples, symmetric contexts comprising an equal number of symbols k preceding and following a currently considered symbol compose the neighborhood for the currently considered symbol, but in other cases, a different number of preceding and following symbols may be used for the context, or symbols either only preceding or following a current considered symbol may be used.

Context-Based Denoising of Data with Simultaneous Update of Multiple Probabilities DUDE as discussed in the section above can denoise one-dimensional or multi-dimensional data structures with any size alphabet of symbols. However, best denoising performance is achieved when count vectors $m(s_{no},\eta)$ extracted from a noisy signal $s_{no}$ have component counts that are large enough to provide a reliable statistical characterization of the noisy signal $s_{no}$. Multi-dimensional data structures with possibly large alphabet such as continuous tone images present challenges to achieving adequate statistics. For example, a grayscale continuous tone image typically uses an alphabet containing 256 symbols, i.e., the 8-bit values from 0 to 255, and a color continuous tone image commonly uses an alphabet containing millions of symbols, e.g., 24-bit values from (0,0,0) to (255,255,255). Further, a context $\eta$ that includes the neighboring symbols up to k pixel away from a central symbol in a two-dimensional array includes $(2k+1)^2-1$ pixels (e.g., 8, 24, ... pixels for k=1, 2, ... ). These typical denoising scenarios for continuous tone images can thus require count vectors $m(s_{no},\eta)$ associated with $256^8$ to $256^{3*24}$ different contexts $\eta$. The large number of symbols and large number of possible contexts $\eta$ of each symbol can thus require a large data sample to provide good statistics when determining the count vectors $m(s_{no},\eta)$ used in the denoising process.

In accordance with an aspect of the invention, a denoising process can use each appearance of a context $\eta$ to simultaneously update the count vectors $m(s_{no},\eta_i)$ for many different contexts $\eta_i$. In particular, the count vectors $m(s_{no},\eta_i)$ for a set of contexts $\eta_i$ can be updated whenever the appearance of a symbol in a context $\eta$ indicates something about the statistical behavior of the other contexts $\eta_i$. The denoising process can thus provide better count statistics because each occurrence of a context can contribute to the determination of a large number of count vectors. One exemplary denoising process embodying this aspect of the invention is based on DUDE and accumulates a single count vector for a set of contexts that produce the same value of a context function $C(\eta)$. The context function $C(\eta)$ is preferably chosen so that all contexts $\eta$ that produce the same value of context function $C(\eta)$ are expected to have similar statistics in the noisy signal $s_{no}$. The set of contexts $\eta$ having the same value of a context function $C(\eta)$ are sometime referred to herein as a context class.

One simple example of a context function $C(\eta)$ corresponds to quantizing the contexts $\eta$. In particular, the context function $C(\eta)$ can be such that contexts $\eta$ in the same quantization bin correspond to the same value of context function $C(\eta)$ and contexts $\eta$ in different bins correspond to different values of context function $C(\eta)$. Known vector or scalar quantization techniques can be employed. An example of quantization of a grayscale image in which each symbol is an 8-bit value uses a context function $C(\eta)$ that maps context vectors $\eta$ to context vectors $\eta'$ resulting from replacement of each 8-bit component of each context $\eta$ with a value corresponding to a bin containing the 8-bit value. For example, each 8-bit component of the context vector $\eta$ can be assigned a bin value corresponding to the three most significant bits (MSB) of the 8-bit component. As a result, this context function $C(\eta)$ maps $256^{24}$ different 24-symbol contexts down to $8^{24}$ different context classes.

In accordance with another aspect of the invention, known features of a data signal being denoised can be used to identify the context classes that group together contexts having similar statistical characteristics. For example, one common feature that can be expected for many data signals is homogeneity. In particular, data signals representing images, audio, or the time or spatial dependence of most systems may exhibit some form of homogeneity. Homogeneity in general implies that particular sections of data include similar slow variations in symbol value even though separated sections may differ significantly in a base value. Accordingly, a context may be best characterized by their variations relative to the base value of the context. A context function $C(\eta)$ exploiting this property can map contexts that differ in base value but have similar variations to the same context class. The context function $C(\eta)$ can additionally use the symmetry in the data signal to identify contexts belonging in the same context class. In particular, data representing dependence on time or another linear parameter may have the same characteristics independent of whether considered in a forward or backward order. For data representing spatial variation, contexts that are rotations or reflections of each other may be expected to show similar statistics and therefore can be mapped to the same context class.

In order to provide an illustrative example, this section concentrates on the example of denoising continuous tone images, but it should be understood that denoising processes disclosed here can more generally be applied to other data signals. For the example of data representing a continuous tone image, portions of the image away from object edges may be expected to include similar slow variations in color even though separated regions may differ significantly in base color. Accordingly, a context of a pixel value may be best characterized by the color or gray level variations relative to a base color or gray level. A context function $C(\eta)$ exploiting this property can map contexts that differ in base color but have similar color variations to the same context class. The context function $C(\eta)$ can additionally use the symmetry common to natural images to identify contexts belonging in the same context class. In particular, contexts that are rotations or reflections of each other would be expected to show similar statistics in a natural image and therefore can be mapped to the same context class.

FIG. 11 illustrates an example of a pixel map 1100 for a continuous tone grayscale image in which the symbols are integers from 0 to 255 and represent levels of image intensity. For the purpose of illustration, pixel map 1100 contains mostly clean data with relatively few symbols that are corrupted by noise, but more generally, a pixel map to which denoising is being applied could contain considerably more noise than is illustrated. In the example of FIG. 11, intensities in a background region of pixel map 1100 happen to vary almost continuously along a diagonal from the top-left to the bottom-right of pixel map 1100. In contrast, an object 1110 in pixel map 1100 has relatively high pixel values, which may correspond to object 1110 being in front of a darker background. Pixel map 1100 illustrates a common property of natural images in that objects and backgrounds tend to have regions in which color varies slowly and edges at which colors may change abruptly. Further, the slow variations in different regions are often the result of the same effects such as the illumination angle or other lighting effects.

A context function $C(\eta)$ for a pixel map can identify a context class as containing contexts with similar variations in color or brightness. For example, context function $C(\eta)$ can map each context vector $\eta$ having the same quantized version $Q(\Delta\eta)$ of a context vector difference $\Delta\eta$ to the same context class. In an exemplary embodiment, the context vector difference $\Delta\eta$ represents the difference between a context vector $\eta$ and a base symbol $\bar{\eta}$ for context vector $\eta$. The base symbol $\bar{\eta}$ for a context vector $\eta$ in general is a symbol that characterizes the context overall and can be defined, for example, to be the maximum, the minimum, the mean, or a weighted or unweighted average of the component symbols in the context vector $\eta$.

Pixel map 1100 of FIG. 11 contains a neighborhood 1121 having a context vector $\eta_1$ and a base symbol $\bar{\eta}_1$. In this example, base symbol $\bar{\eta}_1$ is equal to 24, which is the average of the components of context vector $\eta_1$. The context vector difference $\Delta\eta_1$ has relatively small components, which is to be expected for a region having a continuous color variation. Quantization of context vector difference $\Delta\eta_1$ can, for example, set the small components of context vector difference $\Delta\eta_1$ equal to the nearest integer value, which in this case makes no change. In neighborhood 1121, the central pixel found in context $\eta_1$ happens to have a level equal to base symbol $\bar{\eta}_1$. More generally, the pixel value in context $\eta_1$ may be similar to the components of context vector $\eta_1$ when the context $\eta_1$ is away from an edge of an object, but the pixel in context $\eta_1$ could have any symbol value.

FIG. 11 also shows a neighborhood 1122 in pixel map 1100 having a context vector $\eta_2$ and a base symbol $\bar{\eta}_2$ equal to 36, which is the average of the components of context vector $\eta_2$. The pixel found in context $\eta_2$ in neighborhood 1122 is equal to 255 and in this example differs significantly from base symbol $\bar{\eta}_2$, possibly due to channel-induced noise. Although the component symbols of contexts $\eta_1$ and $\eta_2$ differ and base symbols $\bar{\eta}_1$ and $\bar{\eta}_2$ differ, the context vector differences $\Delta\eta_1$ and $\Delta\eta_2$ are the same after quantization, i.e., $Q(\Delta\eta_1)=Q(\Delta\eta_2)$. As a result, the occurrences of contexts $\eta_1$ and $\eta_2$ can contribute to a class count vector $M(s_{no},C(\eta_1))$ corresponding to a context class $C(\eta_1)$ including contexts $\eta_1$, $\eta_2$, and all other contexts that after a permitted symmetry transformation produce the same quantized context vector difference $Q(\Delta\eta_1)$.

The edge of object 1110 in pixel map 1100 crosses through a neighborhood 1123 having a context vector $\eta_3$. As described above, one rule for identifying a context class selects a base symbol $\bar{\eta}_3$ for a context vector $\eta_3$, e.g., the average of the components of context vector $\eta_3$. However, the average may not be a particularly useful or characteristic value for a context that contains an edge of an object, and predictors associated with edge location may be used to better identify contexts that should be in the same class. Predictors in general are known in image and audio compression, and the specifics of the particular predictor used in a denoising process may be selected according to the noisy channel. However, for illustration, a quantized context vector difference $Q(\Delta\eta_3)$ can still be calculated as shown in FIG. 11 using a base value $\bar{\eta}_3$ such as the average 49.25, which is not in the alphabet, or alternatively by selecting a symbol that is near the average and from the alphabet (e.g., 49). As illustrated in FIG. 11, the quantization that takes the context vector difference $\Delta\eta_3$ to a quantized vector difference $Q(\Delta\eta_3)$ can be a non-linear quantization that is coarser for large components. Quantized context vector difference $Q(\Delta\eta_3)$ clearly differs from quantized context vector differences $Q(\Delta\eta_1)$ and $Q(\Delta\eta_2)$ and therefore contributes to a different class count vector $M(s_{no}, C(\eta_3))$. This distinction of context classes is desirable because the statistics of a context vector $\eta_3$ that is at an edge of an object 1110 may differ from the statistics of context vector $\eta_1$ and $\eta_2$ that are away from any edges.

Each class count vector $M(s_{no}, C(\eta))$ as noted above can be updated for each occurrence of a context $\eta$ or any other context $\eta'$ providing the same value of the context function, i.e., any context $\eta'$ such that $C(\eta')=C(\eta)$. The particular component count of class count vector $M(s_{no}, C(\eta))$ updated for an occurrence of a context in the class $C(\eta)$ depends on the symbol value a found in the context $\eta$. In one embodiment of the invention, the updated component when a symbol a is found in a context $\eta$ has an index corresponding to a difference between the symbol a and an index base symbol $\bar{\eta}$, where the index base symbol $\bar{\eta}$ depends on the context $\eta$. Index base symbol $\bar{\eta}$ in general may be the same as or different from the base symbol $\bar{\eta}$ used to determine the context vector difference $\Delta\eta$. In the case where a symbol difference a$-\bar{\eta}$ identifies the component, the class count vector $M(s_{no}, C(\eta))$ can be of dimension 2n where n is the number of symbols in the alphabet. Accordingly, the count vectors $m(s_{no}, \eta)$ having the proper dimension for use in the DUDE may have fewer components than class count vectors $M(s_{no}, C(\eta))$, but the count vectors $m(s_{no}, \eta)$ can be derived from the corresponding class count vector $M(s_{no}, C(\eta))$ as described further below.

Another view of the exemplary modeling process is that for each symbol that occurs in context $\eta_1$, which has an index base symbol $\bar{\eta}_1$, all count vectors $m(s_{no}, \eta)$ that are associated with the same context class as context $\eta_1$ are simultaneously updated. In an exemplary embodiment, for each appearance of symbol a in context $\eta_1$, the incremented count in a count vector $m(s_{no}, \eta_2)$ for a similar context $\eta_2$ having index base symbol $\bar{\eta}_2$ will be the count vector component corresponding to symbol a$-\bar{\eta}_1+\bar{\eta}_2$, which may be clamped at the extreme range of the alphabet. As a result, two contexts $\eta_1$ and $\eta_2$ in the same context class $C(\eta)$ have the substantially same count vector $m(s_{no}, \eta)$ except that the components of count vector $m(s, \eta_1)$ are shifted by $\bar{\eta}_1-\bar{\eta}_2$ relative to the components of count vector $m(s, \eta_2)$. This process is equivalent to defining class count vectors $M(s_{no}, C(\eta))$ for context classes $C(\eta)$.

More generally, viewing the individual count vectors $m(s_{no}, \eta)$ as being related to one another allows for more general ways of collecting statistics. For example, contexts need not be clustered into disjoint classes, but instead the choice of which contexts are affected by the appearance of a symbol in context $\eta_1$ may depend on other factors. Also, the computation of the vector entry that is affected may involve transformations other than the above shift. For example, a multiplicative factor may map components of different count vectors $m(s_{no}, \eta_1)$ and $m(s_{no}, \eta_2)$ in a case where a symbol appears in a context $\eta_1$ that has some "energy level" and is used to update a count in a context $\eta_2$ that has a different energy level.

Figure 12A:
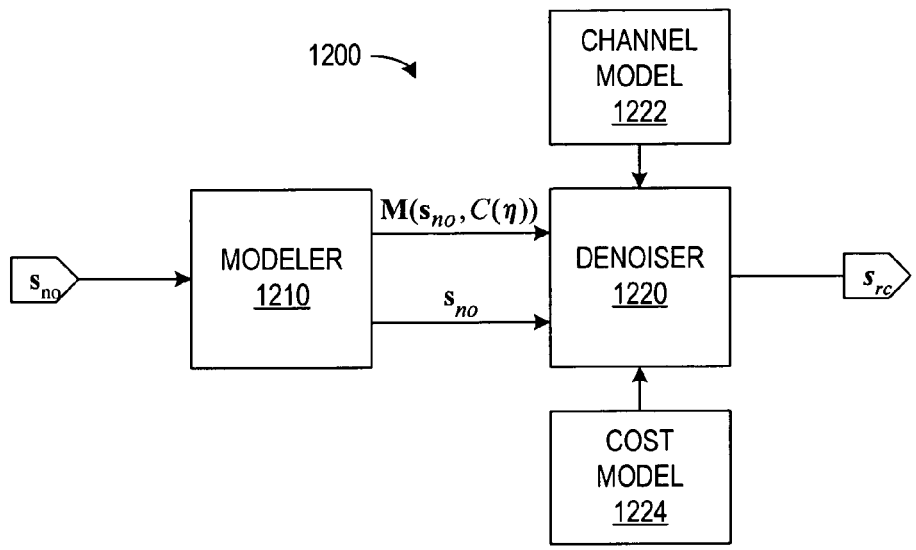
FIG. 12A is a block diagram of a system in accordance with an embodiment of the invention for denoising of continuous tone images.

FIG. 12A illustrates a block diagram for a continuous-tone DUDE system 1200. System 1200 includes a modeler 1210, and a denoiser 1220. Denoiser 1220 generally employs a channel model 1222 that can be selected to model a physical noise-inducing channel and a cost model 1224 that models cost or distortion that results from replacement of symbols in the clean signal $s_{cl}$. The blocks of system 1200 can be implement, for example, using software or firmware routines executed in a special-purpose or general-purpose computer, such software when stored on a machine-readable medium, hardwired units electronically performing the tasks described below, or any combination of these, Modeler 1210 receives and scans the noisy signal $s_{no}$. During a modeling pass, modeler 1210 assigns each context q found in the noisy signal $s_{no}$ to a context class $C(\eta)$ and models the noisy signal by constructing the class count vectors $M(s_{no}, C(\eta))$. The number of context classes and the characteristics of each context class generally depend on the modeling schemes used to characterize the image. Examples of some modeling schemes defining context classes are described above and further below.

Denoiser 1220 uses the noisy signal $s_{no}$, the class count vectors $M(s_{no}, C(\eta))$ from modeler 1210, channel model 1222, and cost or distortion model 1224 to select replacement symbols used in a recovered signal $s_{rc}$. Channel model 1222 corresponds to the symbol-transition-probability matrix or channel matrix $\Pi$ described above and can be used to model different types of channel noise such as Gaussian noise or impulse noise. Cost model 1224 corresponds to the symbol-transformation distortion matrix $\Lambda$ described above.

Figure 13A:
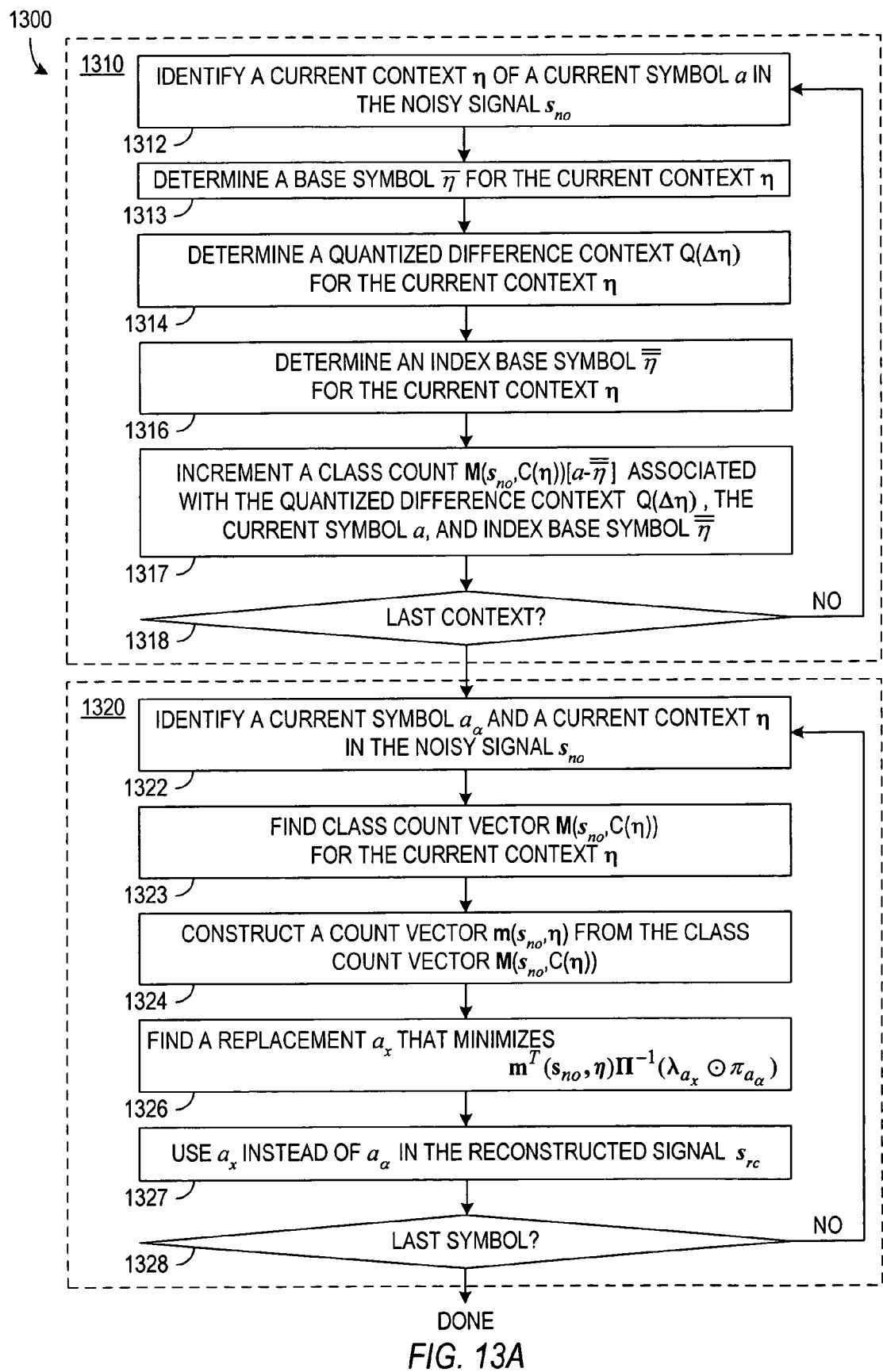
FIG. 13A is a flow diagram of a process in accordance with an embodiment of the invention capable of denoising continuous tone images.

FIG. 13A is a flow diagram of a denoising process 1300 that uses the variation of symbol values to distinguish context classes of a continuous tone image. The continuous tone image may, for example, be a grey scale or color image represented by one or more two-dimensional array of pixel values. Color images are often represented using three pixel maps corresponding to different color component, e.g., R, G, and B or Y, U, and V color component maps, and each component map can be modeled separately. For color images, the two-dimensional arrays of symbols corresponding to different color components may be denoised separately or using correlations among the arrays.

Denoising process 1300 is a two-pass process including a modeling pass 1310 and a denoising pass 1320. Modeling pass 1310, which can be implemented in modeler 1210 of FIG. 12A, scans through the noisy signal $s_{no}$, e.g., pixel map 1100, to determine class count vectors $M(s_{no}, C(\eta))$ associated with the context classes $C(\eta)$. A denoising pass 1320, which can be implemented in denoiser 1220 of FIG. 12A, scans through the noisy signal and replaces individual symbols $a_\alpha$ with symbols $a_x$ that cause minimal estimated overall distortion, e.g., with replacements that minimize $m^T(s_{no}, \eta)\Pi^{-1}(\lambda_{a_x} \odot \pi_{a_\alpha})$ as described above.

Modeling pass 1310 begins in step 1312 with selection or identification of a current symbol a and context $\eta$ from the noisy signal $s_{no}$, e.g., from the pixel map representing the continuous tone image being evaluated. The first symbol selected will generally depend on the size of context η and on a selected order for scanning of the continuous tone image. In an exemplary embodiment, each context η includes 24 symbols corresponding to pixels within a radius of two pixels from the current symbol a, and a common scanning order begins with a context at a top-left corner of a pixel map being scanned. However, any size or shape contexts and any desired order for scanning can be used.

Steps 1313, 1314, and 1316 then respectively determine a base symbol $\overline{\eta}$, a quantized difference context Q(Δη), and an index base symbol $\overline{\overline{\eta}}$ for the current context η. Such values can normally be calculated from the components of the current context η. Base value $\overline{\eta}$, for example, can be any desired function of the component symbols of the current context η. In an exemplary embodiment, base symbol $\overline{\eta}$ is the average of the components of the current context η, but the base symbol $\overline{\eta}$ could alternatively be the mean, the minimum, the maximum, or generally any function of the symbol values in context η. Index base symbol $\overline{\overline{\eta}}$ could similarly be any function of the components of the current context η, but in an exemplary embodiment of the invention, index base symbol $\overline{\overline{\eta}}$ is equal to base symbol $\overline{\eta}$.

Step 1314 determines quantized difference context Q(Δη) from the current context η and base value $\overline{\eta}$, for example, by subtracting base value $\overline{\eta}$ from each of the components of current context η, quantizing the resulting difference vector, and arranging the resulting difference components in a standard order, e.g., with largest components in the top left quadrant of the difference array. The resulting quantized difference context Q(Δη) provides a measure of color variation in the current context η and is useful in defining context classes that group together contexts expected to have similar statistical characteristics in a natural image. For grayscale images, the symbols are generally strictly positive integers but subtraction of base value $\overline{\eta}$ from strictly positive components of current context η can make some components of difference context Δη negative. More generally, determining difference context Δη can extend the range of components of difference context Δη beyond the range of the alphabet of symbols, but quantization still reduces the number of different quantized difference contexts to improve the statistics of modeling pass 1310.

Step 1317 identifies a context class C(η) corresponding to the current context η and increments a component of the class count vector M($s_{no}$,C(η)) associated with the current context class C(η), the current symbol a, and the index base symbol $\overline{\overline{\eta}}$ identified in step 1316. Using the quantized context difference Q(Δη) in identification of context class C(η) can take advantage of expected image homogeneity or continuity characteristics. Additionally, using a standard ordering of components in quantized context difference Q(Δη) can exploit expected small-scale symmetry, e.g., invariance under rotations and/or reflections. Such symmetry allows the reordering of the components of difference context Δη in a manner that lumps difference contexts that differ by a symmetric transform, e.g., by a rotation or reflection, into the same context class. For example, using the two-dimensional relationship that the image imposes on the components of a difference context Δη, each difference context Δη can be rotated or flipped so that the components with the greatest magnitude are in specified quadrants, e.g., in the upper left quadrant of the array of components corresponding to difference context Δη.

Any desired quantization or categorization can then be applied to difference context Δη to define bins corresponding to the context classes C(η). For example, scalar quantization can be separately applied to each component of difference context Δη or a vector quantization technique such as used in LBG compression processes can be applied to difference context Δη. In an exemplary embodiment of the invention, the quantization or categorization defines a small number of bins (e.g., 64 to 512 bins) for all difference contexts Δη. A non-uniform quantization process for difference contexts Δη can be selected to provide a larger number of bins for difference contexts having small component values and relatively fewer bins for difference contexts having large component values. The non-uniform quantization reflects the property that a difference context Δη in a region of slowly varying color (e.g., a region away from a boundary) typically will have small component values, while a rarer difference context Δη corresponding to a region containing a boundary in the image typically will have larger component values.

In general, the number of components in class count vector M($s_{no}$,C(η)) can differ from the number of components of count vectors m($s_{no}$,η). In particular, the number of components in each count vector m($s_{no}$,η) is equal to the number of symbols in the alphabet for the noisy signal $s_{no}$. In a preferred embodiment, the components of class count vector M($s_{no}$,C(η)) are identified by symbol differences a−$\overline{\overline{\eta}}$, where the index base value $\overline{\overline{\eta}}$ depends on the context η and may be the same as or different from the base values $\overline{\eta}$ used to determine difference context Δη. In a special case where index base value $\overline{\overline{\eta}}$ is zero, each class count vector M($s_{no}$,C(η)) has the same number of components as each count vector m($s_{no}$,η), but each class count vector M($s_{no}$,C(η)) more generally has up to twice as many components as each count vector m($s_{no}$,η).

Step 1318 determines whether the current context η is the last context in the order of scanning during modeling pass 1310. If not, modeling pass 1310 branches back to step 1312 and selects the next context as the current context η and repeats steps 1312, 1313, 1314, 1316, 1317, and 1318. When step 1318 determines that the last context has been evaluated, modeling pass 1310 is complete. The result of modeling pass 1310 is a set of class count vector M($s_{no}$,C(η)) respectively for the context classes C(η).

Denoising pass 1320 scans through the noisy signal $s_{no}$ and generates a reconstructed signal $s_{rc}$ representing a denoised image. In denoising pass 1320, step 1322 selects a current symbol $a_\alpha$ and context η for evaluation. Step 1323 identifies the class count vector M($s_{no}$,C(η)) that modeling pass 1310 found for the current context η, and then step 1324 constructs a count vector m($s_{no}$,η) for the current context η. More specifically, step 1323 identifies the context class C(η) corresponding to context η, and accesses the class count vector M($s_{no}$,C(η)) corresponding to context class context class C(η). Step 1324 then constructs count vector m($s_{no}$,η) from class count vector M($s_{no}$,C(η)). This construction can be achieved, for example, shifting class count vector M($s_{no}$,C(η)) by the index base value $\overline{\overline{\eta}}$ for the current context η, truncating or clamping the set of components of the shifted class count vector to the required symbol range, and renormalizing the resultant count vector m($s_{no}$,η) if necessary.

The DUDE process as described above selects a replacement $a_x$ that minimizes a measure $m^T(s_{no},\eta)\Pi^{-1}(\lambda_{a_x} \odot \pi_{a_\alpha})$ of the estimated distortion. Step 1326 uses the determined count vector m($s_{no}$,η) to find a replacement symbol $a_x$ causing the minimum of estimated image distortion $m^T(s_{no},\eta)\Pi^{-1}(\lambda_{a_x} \odot \pi_{a_\alpha})$ when replacing a symbol $a_\alpha$ in context η in noisy signal $s_{no}$. As noted above, this minimization process will generally depend on the choice of a model for the noisy channel (i.e., the choice of symbol-transition-probability or channel matrix Π) and the choice of cost or distortion model (i.e., the choice of $\lambda_{a_x}$). Step 1327 then uses the minimizing symbol $a_x$ in the generated symbols of the reconstructed signal $s_{rc}$ representing the denoised image.

In accordance with an aspect of the invention, a denoising pass for a noisy channel having a near-circulant channel matrix Π can avoid evaluating the matrix product $m^T(s_{no}, \eta)\Pi^{-1}(\lambda_{a_x}\pi\odot_{a_\alpha})$ for each context η, In particular, if channel matrix Π is circulant (or nearly circulant), which is the case for a channel introducing Gaussian noise, a product $M^T(s_{no}, C(\eta))\Pi^{-1}$ can be evaluated only once per context class $C(\eta)$. When denoising pass 1320 later encounters a context η, the quantity $m^T(s_{no},\eta)\Pi^{-1}$ can be found by shifting components of the already calculated and saved product $M^T(s_{no},C(\eta))\Pi^{-1}$. The quantity $m^T(s_{no},\eta)\Pi^{-1}$ found from a shift can then be used in the determination of a replacement symbol $a_x$ causing the minimum of estimated image distortion $m^T(s_{no}, \eta)\Pi^{-1}(\lambda_{a_x}\odot\pi_{a_\alpha})$ when replacing a symbol $a_\alpha$ in context η in noisy signal $s_{no}$. This provides a huge complexity saving by converting a matrix multiplication to a shift operation.

Step 1328 checks whether the current symbol/pixel is the last to be denoised. If not, denoising pass 1320 branches back to step 1322 and selects another current symbol $a_\alpha$ and current context η from the noisy signal $s_{no}$. Denoising process 1300 is complete after the last pixel or symbol has been selected and denoised.

DUDE with Rough or Iterative Denoising for Improved Modeling

As described above, a modeling pass for DUDE can scan a noisy signal $s_{no}$ to generate count vectors $m(s_{no},\eta)$ or class count vectors $M(s_{no},C(\eta))$ that statistically characterize the noisy signal $s_{no}$. The available contexts during the modeling pass are from the noisy signal $s_{no}$ and include neighboring "noisy" symbol values. The contexts may thus be contaminated with errors, so that two contexts in the noisy signal $s_{no}$ may differ from each other even when the corresponding contexts in the clean signal $s_{cl}$ are identical. The modeling process can still learn about channel-induced errors that occur in similar or identical contexts if given enough data. In particular, the errors in the contexts do not prevent the modeling process from accurately characterizing the noisy signal $s_{no}$, so that the denoising process asymptotically approaches the optimal denoising solution. However, in a non-asymptotic regime, i.e., a short noisy signal $s_{no}$, noise in the component symbols of the contexts may make identification of similar context more difficult and is therefore a source of modeling inefficiency.

In accordance with an aspect of the present invention, a denoising system can apply "rough" denoising to the noisy signal $s_{no}$ to roughly clean the symbols that are used to identify matching contexts, e.g., contexts that are the same or in the same context class. This rough denoising can employ prior knowledge of the system such as knowledge of the noise-inducing channel and/or of statistical properties of the original data. For example, if a channel is known to introduce impulse noise into a grayscale image, the noisy image can be roughly denoised using a median filter, which is effective at reducing impulse noise. In accordance with a further aspect of the invention, the DUDE itself can act as a filter for rough denoising that is performed iteratively to remove noise from the contexts used in modeling during a subsequent iteration.

Figure 12B:
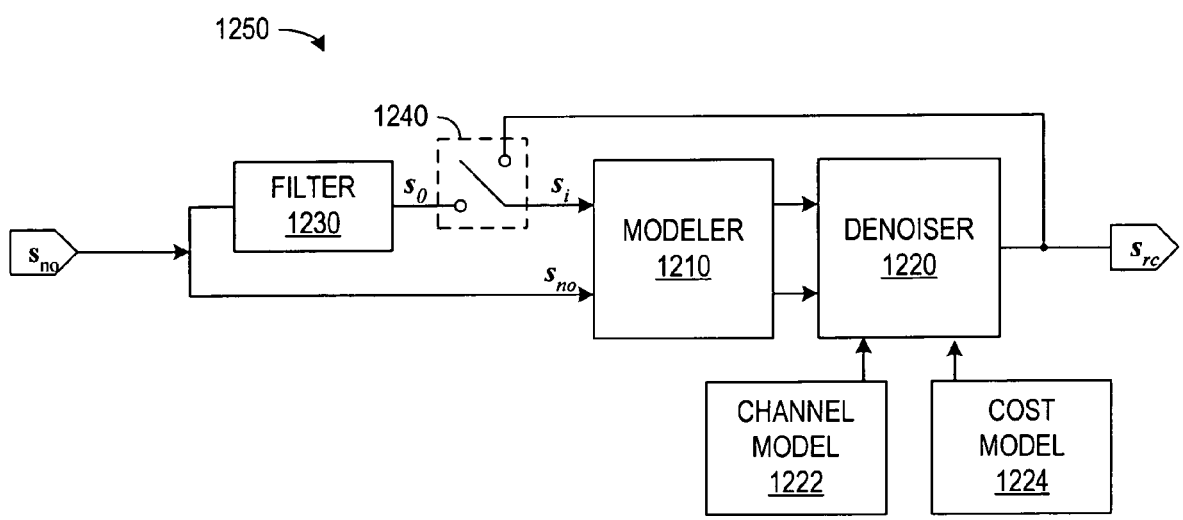
FIG. 12B is a block diagram of a system in accordance with an embodiment of the invention using rough denoising and/or iterative denoising to approximate the clean contexts for noisy symbols.

FIG. 12B illustrates a block diagram for DUDE system 1250 using rough denoising to improve modeling of a noisy signal $s_{no}$. System 1200 includes a filter 1230, a modeler 1210, and a denoiser 1220. Exemplary implementations of the blocks of system 1200 include software or firmware routines executed in a general-purpose computer, such software when stored on a machine-readable medium, hardwired units electronically performing the tasks described below, or any combination of these.

Filter block 1230 receives the noisy signal $s_{no}$ representing a continuous tone image (or other data) and performs rough denoising to produce a filtered signal $s_0$ for use in modeler 1210. Applying the correct filtering scheme to noisy signal $s_{no}$ can provide a crude, preliminary noise removal. The choice of the filtering scheme for filter block 1230 may depend on some knowledge of the noise-inducing channel and/or the original data or can be found experimentally to provide good performance for a particular system. For example, a median filter may be appropriate for a channel introducing impulse noise, and a Wiener filter or a low pass filter may be best for rough filtering when a channel introduces Gaussian noise. More generally, a filter type and filter parameters that improve image or data quality can be identified through experiment. Filter 1230 preferably reduces the effect of the noise on context modeling in modeler 1210, but filter 1230 should not become a source of context modeling degradation. For example, a low pass filter can reduce the effect of Gaussian noise, but an aggressive (low cutoff frequency) could also blur the image and destroy borders.

An input selection system 1240 selects either pre-filtered signal $s_0$ or an intermediate recovered signal $s_{rc}$ as a context signal $s_i$ for modeler 1210. Modeler 1210 uses the context signal $s_i$ to identify contexts η and/or context classes $C(\eta)$. Modeler 1210 also receives the original noisy signal $s_{no}$ and uses the noisy signal $s_{no}$ to identify the current symbol a for each context η.

Using a pre-filtered signal $s_0$ can simplify identification of contexts having similar statistics and therefore provide an improved model of the noisy signal $s_{no}$ even when the rough denoising that filter 1230 provides is far from optimal. For example, a median filter generally makes strong assumptions about the smoothness of data, with no use of context information, and thus fails to faithfully preserve some edges in an image. However, a median filter can still reduce the effect of impulse noise and produce an image that is faithful enough to serve as a basis for the identification of matching or similar contexts.

In an exemplary embodiment of the invention, modeler 1210 increments a component count of class count vector $M(s_{no},s_i, C(\eta))$ for each occurrence of a context η in the context signal $s_i$. However, the index $[a-\overline{\eta}]$ that identifies the component of the class count vector incremented depends on the symbol a from a position in noisy signal $s_{no}$ corresponding to the position of the context η in context signal $s_i$. The class count vector $M(s_{no},s_i,C(\eta))$ can thus be thought of as a function of both the noisy signal $s_{no}$ and the context signal $s_i$, although signals $s_{no}$ and $s_i$ are not strictly independent.

Denoiser 1220 uses the class count vectors $M(s_{no},s_i,C(\eta))$ from modeler 1210, a channel model 1222, and a cost or distortion model 1224 to select replacement symbols. Channel model 1222 corresponds to the symbol-transition-probability matrix or channel matrix Π described above and can be used to model different types of channel noise such as Gaussian noise or impulse noise. Distortion model 1224 corresponds to the symbol-transformation distortion matrix Λ described above. In one embodiment of the invention, denoiser 1220 identifies contexts in context signal $s_i$ but applies the symbol replacement to noisy signal $s_{no}$ to produce a denoised or reconstructed signal $s_{rc}$.

The fact that the denoiser 1220 is a filter allows use of denoiser 1220 for rough denoising in a recursive or iterative denoising process. System 1200 achieves this configuration through operation of input selection system 1240 so that reconstructed signal $s_{rc}$ from denoiser 1220 becomes the context signal $s_i$ input to modeler 1210. An advantage of using denoiser 1220 and DUDE for rough denoising is that the DUDE can work well for denoising even if the data model assumed for the original data is far from perfect. Accordingly, when the noise-inducing channel is not well enough known for selection of a good filter operation for filter block 1230, filter block 1230 can be eliminated or can perform no filtering, and denoiser 1220 can perform the rough denoising after an initial modeling scan of the noisy signal $s_{no}$. In particular, the recursive or iterative pre-filtering using denoiser 1220 can be activated, for example, after system 1200 has processed a sufficient number of symbols and contexts.

Figure 13B:
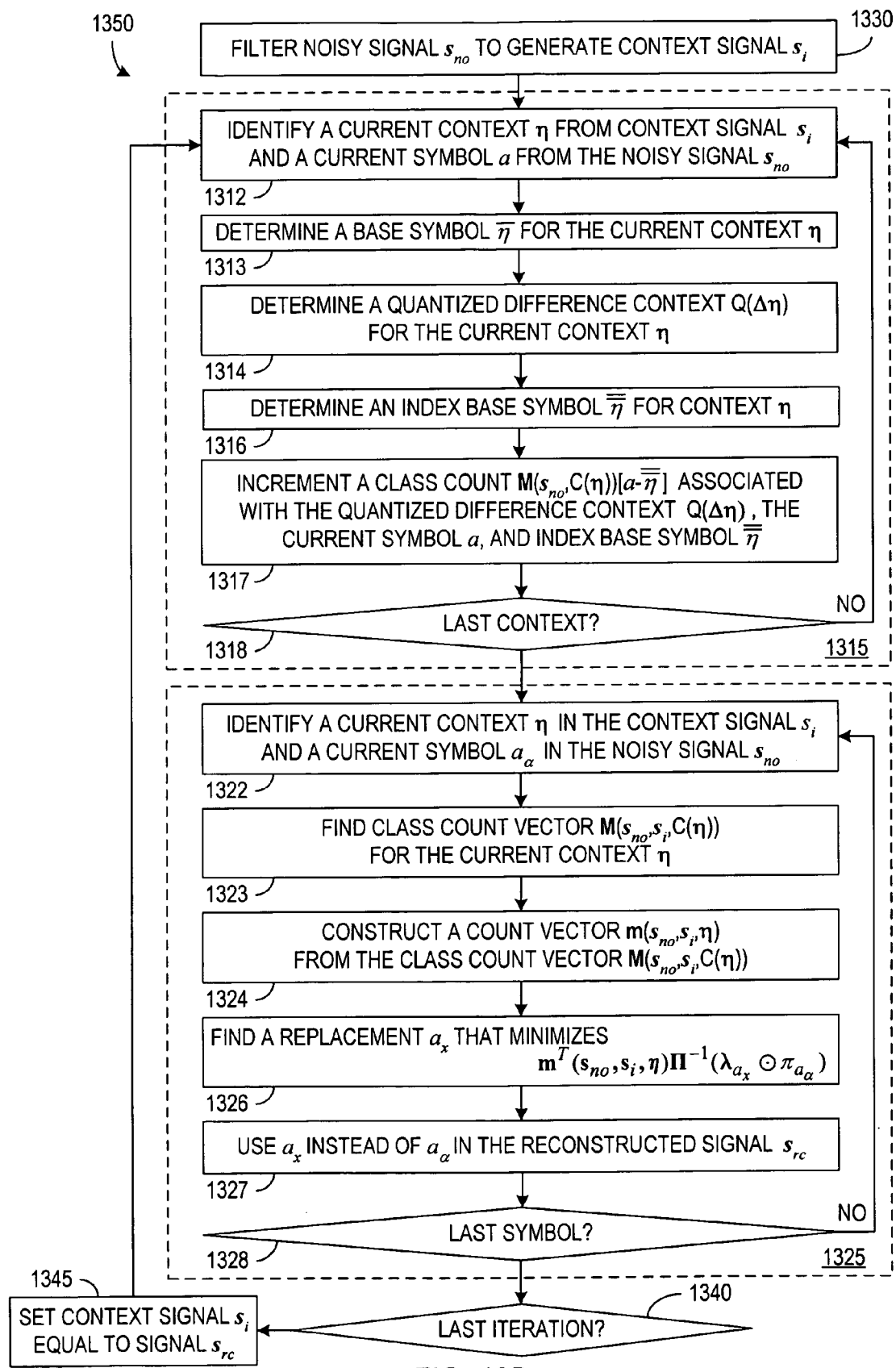
FIG. 13B is a flow diagram of a process in accordance with an embodiment of the invention using rough and/or iterative denoising during modeling of a continuous tone image being denoised.

FIG. 13B is a flow diagram of an exemplary denoising process 1350 that can be implemented in system 1250 of FIG. 12B. Denoising process 1350 optionally begins with a step 1330 of filtering noisy signal $s_{no}$ to produce an initial context signal $s_i$. As noted above, the filter operation can be selected according to known characteristics of the noise-inducing channel and/or the original data, can be a filter operation found by experiment to be effective, or can be skipped if only the DUDE is used for iterative denoising. After filtering step 1330, process includes a series of one or more repetitions of a modeling pass 1315 and a denoising pass 1325.

Modeling pass 1315 includes steps 1312, 1313, 1314, 1316, 1317, and 1318, which are performed in substantially the same manner as described above in regard to modeling pass 1310 of FIG. 13A. A primary difference between modeling pass 1310 of FIG. 13A and modeling pass 1315 of FIG. 13B is that step 1312 in modeling pass 1315 selects the current context η from context signal $s_i$ instead of the noisy signal $s_{no}$. Otherwise, for each current symbol a from noisy signal $s_{no}$ and the corresponding current context η from context signal $s_i$, modeling pass 1315 determines a base symbol $\bar{\eta}$ for the current context η (step 1313), determines a quantized difference context Q(Δη) from the current context η and base symbol $\bar{\eta}$ (step 1314), determines an index base symbol $\overline{\bar{\eta}}$ for the current context η (step 1316), and increments in class count M($s_{no}$,$s_i$,C(η)) a component corresponding to the current symbol a from the noisy signal $s_{no}$ and index base symbol $\overline{\bar{\eta}}$ (step 1317). Each execution of modeling pass 1315 continues until step 1318 indicates modeling pass 1315 is complete, e.g., after an entire image or a sufficient number of contexts have been processed to generate accurate class count vectors M($s_{no}$,$s_i$,C(η)).

Denoising pass 1325 includes steps 1322, 1323, 1324, 1326, 1327, and 1328, which are substantially similar to the corresponding steps of denoising pass 1320 described above in regard to FIG. 13A. A primary difference between denoising passes 1325 and 1320 is that step 1322 in denoising pass 1325 of FIG. 13B identifies a current context η in the context signal $s_i$ that corresponds to the current symbol $a_\alpha$ in the noisy signal $s_{no}$. Otherwise for each symbol $a_\alpha$ from the noisy signal $s_{no}$ and corresponding context η from the context signal $s_i$, denoising pass 1325 finds the class count vector M($s_{no}$,$s_i$,C(η)) for the current context η (step 1323), constructs a count vector m($s_{no}$,$s_i$,η) (step 1324), finds a replacement $a_x$ that minimizes $m^T(s_{no},s_i,\eta)\Pi^{-1}(\lambda_{a_x} \odot \pi_{a_\alpha})$ (step 1326), and replaces the current symbol $a_\alpha$ in the noisy signal $s_{no}$ with the identified symbol $a_x$ (step 1327). Denoising pass 1325 continues until step 1328 determines that the last symbol has been denoised.

A step 1340 determines whether the last iteration of modeling pass 1315 and denoising pass 1325 have been completed. If another iteration is desired, a step 1345 sets the context signal $s_i$ equal to the reconstructed signal $s_{rc}$, and process 1350 branches back to repeat modeling pass 1315.

The determination in step 1340 of whether last iteration is complete can use criteria that differ for different embodiments of process 1350. For example, in one embodiment, process 1350 performs a fixed number of iterations of modeling pass 1315 and denoising pass 1325 and stops when that number of iterations is complete. In another embodiment, step 1340 can compare the reconstructed signal the current and previous iterations and determine whether further iterations are expected to improve image quality. For example, if a measure of the difference between the reconstructed signal for two consecutive iterations is sufficiently small, further iterations may be expected to provide little further improvement in the reconstructed data. In yet another embodiment, step 1340 for a denoised image relies on user input that indicates which iteration provides an image that the user subjectively finds best.

Inversion of Near-Singular Channel Models

The DUDE processes as described above use the product of the inverse channel matrix $\Pi^{-1}$ and an empirical count vector m($s_{no}$,η), for example, as indicated in Equation 2 above, when determining the denoised symbol values. Ideally, the product $m^T(s_{no},\eta)\Pi^{-1}$ for these processes is approximately proportional (or equal if count vector m($s_{no}$,η) is normalized) to a probability vector p indicating the probabilities of finding symbols in context η in the original/clean signal. However, the channel matrix Π can often be singular or near singular, and statistical fluctuations in the experimentally determined count vector m($s_{no}$,η) can cause the product $m^T(s_{no},\eta)\Pi^{-1}$ to differ significantly from the desired probability vector p. This section describes how DUDE can be adapted to find a probability vector p such that $p^T\Pi$ is closest to $m^T$ (normalized) in $L_2$ or square norm. The solution avoids directly computing $m^T(s_{no},\eta)\Pi^{-1}$ and projecting that vector on to the probability simplex because such a direct process could blow up the statistical fluctuations in count vector m($s_{no}$,η).

One embodiment of the invention employs a pseudo inverse in place of inverse channel matrix $\Pi^{-1}$ when a singular value decomposition of the channel matrix Π has a low condition number, i.e., a relatively low value for the ratio of the maximum and minimum singular values found in the decomposition. In an exemplary embodiment of this process, a pseudo inverse Pinv(Π') can be computed via a singular value decomposition of the channel matrix Π followed by elimination of the smallest singular values. As described further below, matrix Π' is a singular matrix that is obtained from channel matrix Π by insertion of 0 in place of small-magnitude entries in a diagonal matrix found through the singular value decomposition of channel matrix Π. Under specific conditions, pseudo inverse matrix Pinv(Π') is similar to inverse channel matrix $\Pi^{-1}$ but avoids amplification of statistical fluctuations in the count vectors, and use of the pseudo inverse matrix Pinv(Π') in place of inverse matrix $\Pi^{-1}$ in determination of denoised data improves denoising performance by improving the estimate of statistical properties of the original signal. However, if the condition number of the channel matrix Π is too high, determination of a pseudo inverse Pinv(Π') may discard too many of the diagonal values, and estimation techniques based on expansion of count vectors in terms of the rows of the channel matrix as described further below can be used in determination of denoised data.

Figure 14:
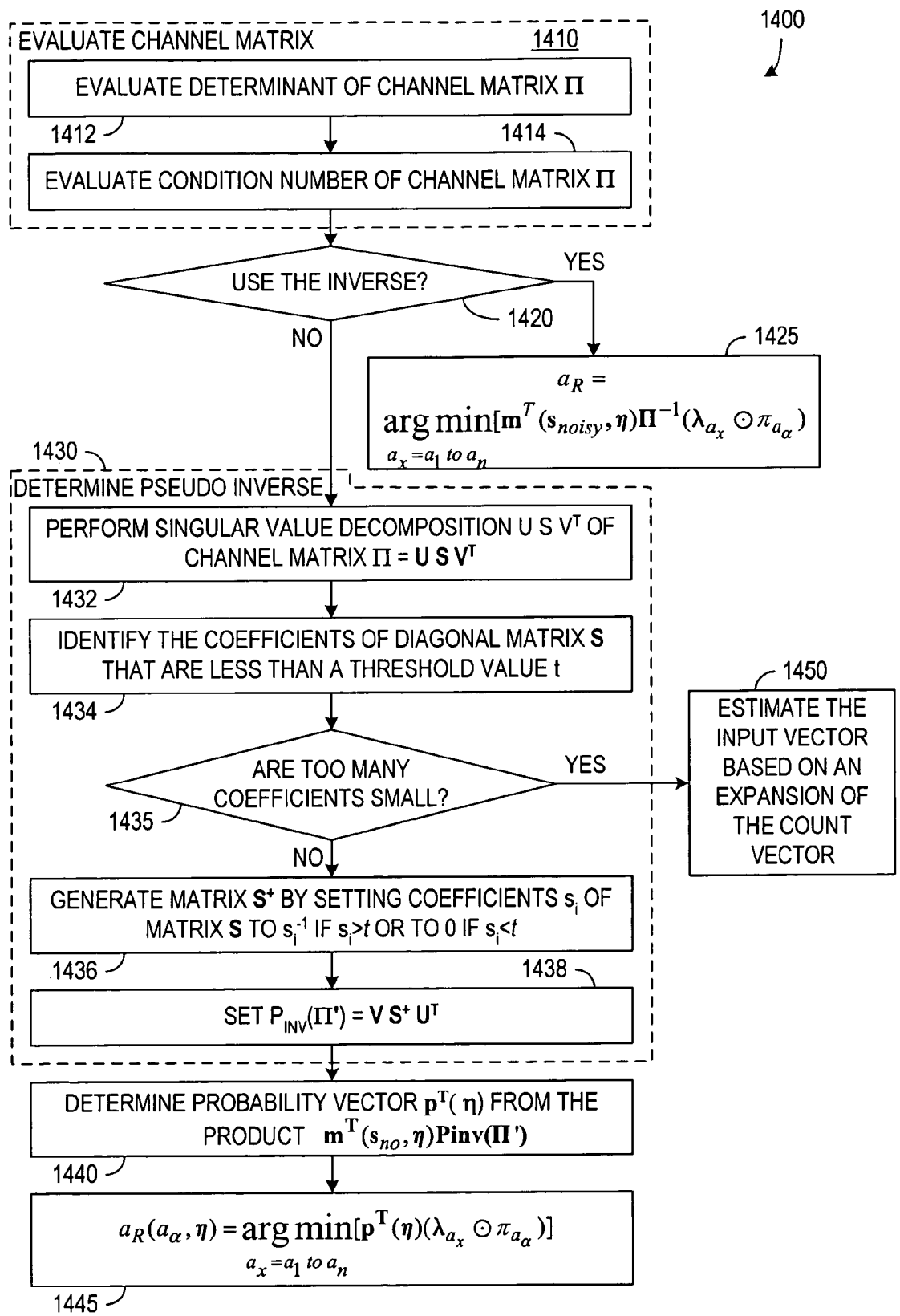
FIG. 14 is a flow diagram of a process for generating denoised data.

FIG. 14 is a flow diagram of a process 1400 for determining a denoised value. Process 1400 begins with an evaluation 1410 of channel matrix Π to determine whether the inverse channel matrix $\Pi^{-1}$ is suitable for numeric determination of denoised values. In an exemplary embodiment, the evaluation of channel matrix Π includes a step 1412 of determining a determinant det(Π) of the channel matrix Π and a step 1414 of determining the condition number for channel matrix Π. A decision step 1420 then decides whether to use the inverse matrix $\Pi^{-1}$ in generating denoised data. If inverse channel matrix $\Pi^{-1}$ is used, step 1425 determines a symbol $a_R$ that replaces symbol $a_\alpha$ in context η using Equation 3 (or equivalently Equation 2 as described above.) In Equation 3, count vector $m^T(s_{no},\eta)$ is the empirical count vector of symbols in context η within the noisy data $s_{no}$ or can be generated from a class count vector as described above, matrix $\Pi^{-1}$ is the inverse of the channel matrix, and vector $\lambda_{a_x} \odot \pi_{a_\alpha}$ is the Schur product of columns $a_x$ and $a_\alpha$ respectively of the distortion and channel matrices Λ and Π.

Equation 3:

$$a_R(\alpha, \eta) = \operatorname*{argmin}_{a_x = a_1 \text{ to } a_n} \left[ m^T(s_{no}, \eta) \Pi^{-1} (\lambda_{a_x} \odot \pi_{a_\alpha}) \right]$$

If the inverse channel matrix $\Pi^{-1}$ is not being used, step 1430 determines whether a pseudo inverse matrix Pinv(Π') of the channel matrix is suitable. In the illustrated embodiment of the invention, the pseudo inverse matrix Pinv(Π') is the Moore-Penrose inverse, but more generally, other generalized matrix inverses could be used. The Moore-Penrose inverse can be found as illustrated in steps 1432, 1434, 1435, 1436, and 1438 of FIG. 14. When determining the pseudo inverse, step 1432 performs a singular value decomposition (SVD) of the channel matrix Π as indicated in Equation 4. In Equation 4, each of matrices U and V is an orthogonal matrix. Matrix S in Equation 4 is a non-negative diagonal matrix.

$$\Pi = U \cdot S \cdot V^T \qquad \text{Equation 4:}$$

Step 1434 determines the number of diagonal coefficients of matrix S that are less than a threshold t. In an exemplary embodiment, Equation 5 gives the threshold t in terms of the largest coefficient $s_0$ of matrix S and the smallest dimension m or n of the channel matrix Π. In general, the channel matrix will be square (n=m) when the alphabets for the clean and noisy signals are the same. The small coefficients of matrix S can be sources of instability in numerical evaluations of inverse $\Pi^{-1}$ and can be ignored in the pseudo inverse Pinv(Π') as described further below. However, if too many of the diagonal coefficients of diagonal matrix S are ignored, the product $m^T(s_{no},\eta)$ Pinv(Π') will fail to properly characterize the statistical properties of the clean data, and a decision step 1435 determines that an estimation process 1450 should be used as described further below in the determination of the denoised symbol $a_R$.

$$t = 0.0001 \min(m,n) s_0 \qquad \text{Equation 5:}$$

Pseudo inverse Pinv(Π') is preferably used if the channel matrix Π has a determinant that is less than about 0.001 and a condition number that is less than 50. In which case, determination 1430 of pseudo inverse Pinv(Π') continues with the step 1436 of generating a diagonal matrix $S^+$ that is found by replacing each coefficient $s_i$ that is greater than or equal to threshold t in diagonal matrix S with multiplicative inverse $s_i^{-1}$ and replacing coefficient $s_i$ that is less than threshold t in diagonal matrix S with 0. Step 1438 sets pseudo inverse Pinv(Π') equal to $VS^+U^T$. In a manner similar to that described above for the DUDE, a probability vector $p^T(\eta)$ can be estimated from the product $m^T(s_{no},\eta)$ Pinv(Π') in step 1440, and the denoised symbol $a_R$ can then be determined in step 1445 using Equation 6. As noted further below, the product $m^T(s_{no},\eta)$Pinv(Π') may be a probability vector $p^T(\eta)$ or may require adjustment to create the probability vector $p^T(\eta)$.

Equation 6:

$$a_R(a_\alpha, \eta) = \operatorname*{argmin}_{a_x = a_1 \text{ to } a_n} \left[ p^T(\eta)(\lambda_{a_x} \odot \pi_{a_\alpha}) \right]$$

Channel matrix Π in some cases is such that neither inverse $\Pi^{-1}$ nor pseudo inverse Pinv(Π') provides an accurate numeric projection of empirical count vectors $m(s_{no},\eta)$ from the noisy signal $s_{no}$ back to the space of the clean signal $s_{cl}$. In these cases, an estimation process 1450 can be used to effectively project the empirical count vector $m(s_{no},\eta)$ on to the space of the probability vectors $p(s_{no},\eta)$ for clean signal $s_{cl}$. More specifically, an estimation process can iteratively determine an expansion for count vector $m(s_{no},\eta)$ in terms of the rows of channel matrix Π and use that expansion to identify a probability vector $p(s_{no},\eta)$ such that $p^T(s_{no},\eta)\Pi$ yields the (normalized) count vector $m^T(s_{no},\eta)$. (The arguments of vectors m and p, which identify the noisy signal $s_{no}$ and context η, are sometimes omitted below to simplify expressions.) The probability vector $p^T$ thus determined can be used in place of $m^T\Pi^{-1}$ when finding the denoised symbols.

Figure 15:
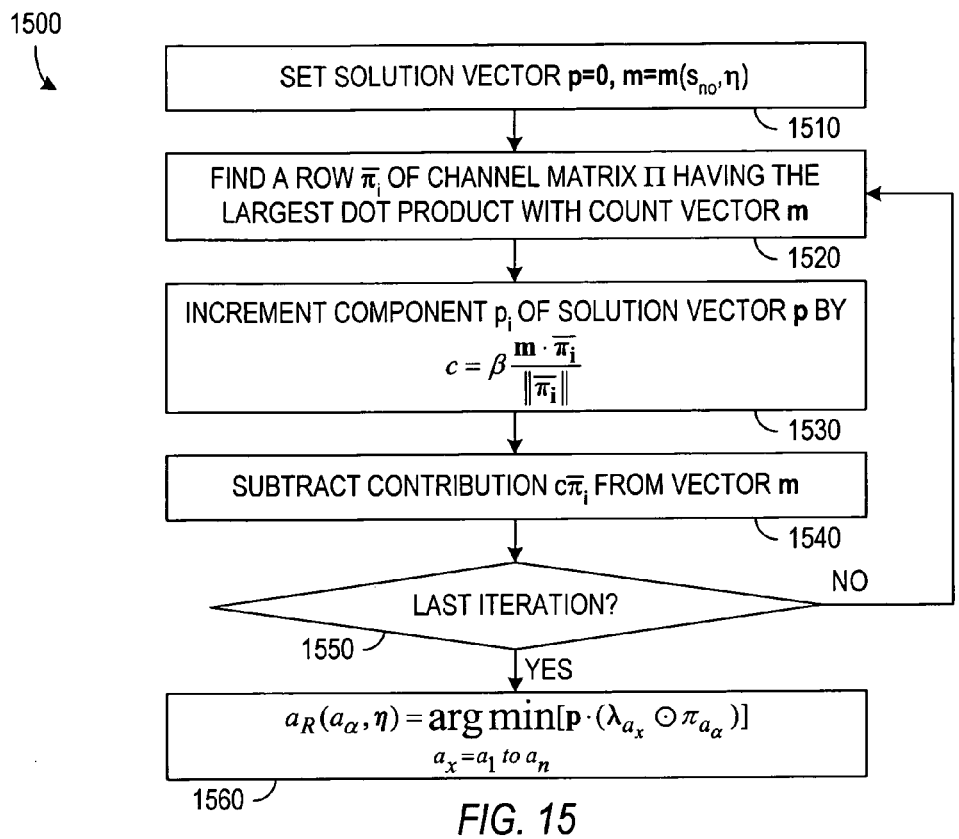
FIG. 15 is a flow diagram of a process in accordance with an embodiment of the invention that estimates an input probability vector without determining an inverse of a channel matrix.

FIG. 15 illustrates an exemplary embodiment of an estimation process 1500 for a probability vector p that upon transmission through the noisy channel results in a count vector m. Estimation process 1500 uses an iterative process to construct an expansion of count vector m in terms of the rows of channel matrix Π. Step 1510 begins process 1500 by setting a solution for probability vector p to an initial value (e.g., to zero). Step 1520 then finds the row $\bar{\pi}_i$ of channel matrix Π having the largest dot product with count vector m. The component $p_i$ of solution vector p corresponding to the identified row $\bar{\pi}_i$ of channel matrix Π is then incremented in step 1530 using the formula of Equation 7. In Equations 7 and 8, $\|\bar{\pi}_i\|$ is the squared norm or magnitude of row vector $\bar{\pi}_i$, and β is a constant less than one, for example, about equal to 0.1. In general, constant β is selected so that the solution vector p does not converge prematurely. Step 1540 then subtracts from vector m a contribution as indicated in Equation 8 to account for the addition to vector p.

Equation 7:

$$p_i \rightarrow p_i + \beta \frac{m \cdot \bar{\pi}_i}{\|\bar{\pi}_i\|}$$

Equation 8:

$$m \rightarrow m - \beta \frac{m \cdot \bar{\pi}_i}{\|\bar{\pi}_i\|} \bar{\pi}_i$$

Steps 1520, 1530, and 1540 are repeated until a decision step 1550 determines that the iterations are finished. The iterations may be deemed finished when, for example, the sum of the components of the normalized probability vector p is 1, a predetermined maximum number of iterations have been executed, or the energy remaining in count vector m is below a predetermined threshold. At this point, probability vector p can be renormalized to have a magnitude of 1 and or checked for negative components as described further below. For determination of the denoised values, the identified probability vector p for an empirical count vector m can be used in place of $m^T \Pi^{-1}$ as shown in step 1560 and Equation 9.

Equation 9:

$$a_R(a_\alpha, \eta) = \operatorname*{argmin}_{a_x=a_1 \text{ to } a_n} [p \cdot (\lambda_{a_x} \odot \pi_{a_\alpha})]$$

The empirical nature of count vectors m can sometimes lead to the probability vector $p^T$, $m^T\text{Pinv}(\Pi')$, or $m^T\Pi^{-1}$ having one or more negative components. When this occurs, a correction process can project the probability vector $p^T$, $m^T\text{Pinv}(\Pi')$, or $m^T\Pi^{-1}$ to a vector p* having only non-negative components.

Figure 16:
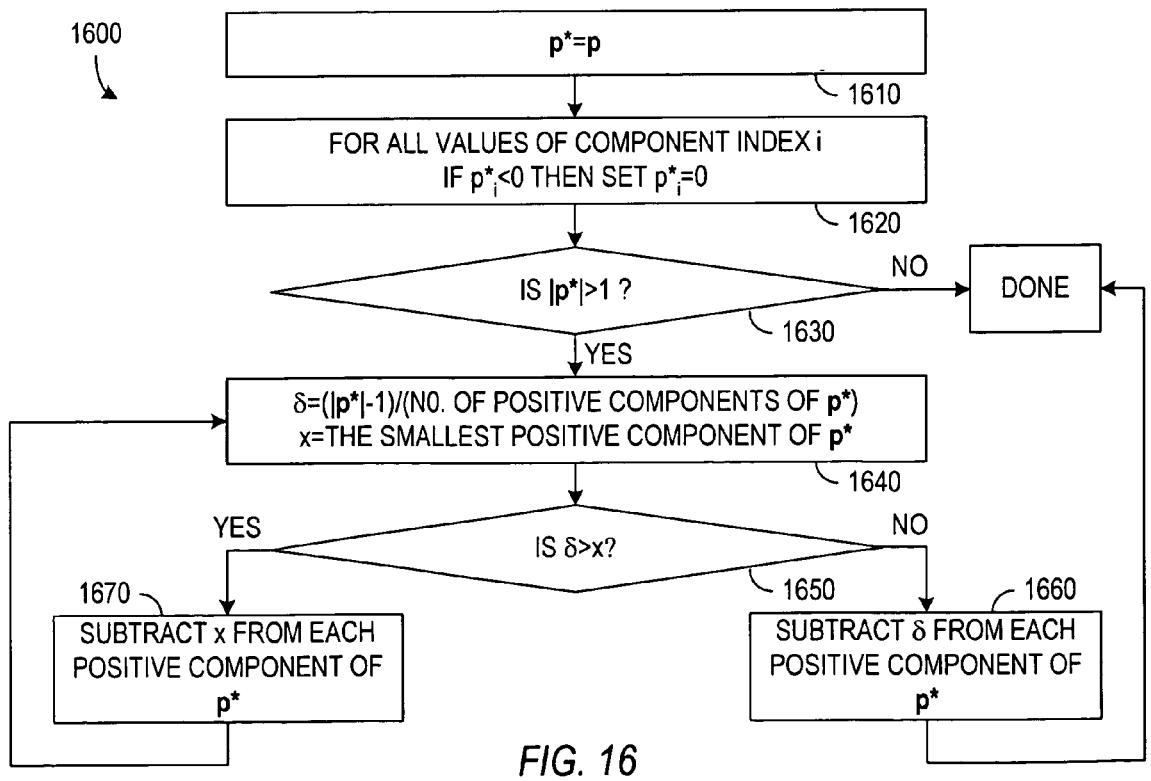
FIG. 16 is a flow diagram of a process for eliminating negative components from an empirically determined input probability vector.

FIG. 16 illustrates an exemplary process 1600 for producing a non-negative vector p* from a vector p that may have negative components. Process 1600 begins with a step 1610 of setting vector p* equal to the vector p. At this point, vector p* may have negative components. Step 1620 sets all of the negative components of p* to zero. Eliminating the negative components may cause the sum of the component probabilities in vector p* to be greater than 1.

Decision step 1630 checks to see whether the sum of the components of vector p* is greater than 1. If not, process 1600 is done and vector p* has only non-negative components that sum to 1, as generally required for a probability vector. If the sum of the components of vector p* is greater than 1, process 1600 branches from step 1630 to step 1640. Step 1640 identifies the smallest positive component x of vector p* and determines a per-component difference δ, which is a ratio of the difference between the sum of the components of vector p* and 1 and the number of positive components.

Step 1650 then determines whether the per-component difference δ is greater than the smallest positive component x. If not, step 1660 subtracts per-component difference δ from each positive component, leaving vector p* with components that sum up to 1 as required of a probability vector. Otherwise, step 1670 subtracts the smallest positive component from each of the positive components and then branches back to step 1640. Each execution of step 1670 sets the prior smallest positive component to zero and decreases the sum of the components of vector p* by less than the previous difference from 1. After a sufficient number of repetitions, the per-component difference δ will be smaller than the smallest component, and process 1600 will execute step 1660 and end.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A denoising process comprising:
a modeling pass that includes:
selecting a current symbol from a received signal;
identifying a current context for the current symbol;
updating a data structure to reflect occurrence of the current symbol in the current context, wherein the data structure indicates probabilities of occurrences of symbols in contexts, and the updating for the current symbol and the current context increases probabilities associated with a plurality of contexts; and
repeating the selecting step, the identifying step, and the updating step a plurality of times; and
a denoising pass that includes using the data structure to determine whether to replace a symbol in the received signal when generating a reconstructed signal.

2. The process of claim 1, wherein the denoising pass comprises:
constructing from the data structure a first count vector corresponding to a first context of a received symbol having a value I;
using the first count vector, a channel model, and a signal degradation model to identify a value J that is estimated to mimize overall degradation in the reconstructed signal relative to an original signal when the value J replaces the value I in the first context, wherein the channel model indicates a probability for a channel to convert an input symbol having a first value to a received symbol having a second value in the received signal, and the signal degradation model indicates signal degradation that occurs if a symbol having the value I is replaced by another symbol value; and
replacing each occurrence of the value I that appears in the first context in the received signal with the value J.

3. The process of claim 1, wherein the contexts associated with increased probabilities resulting from updating the data structure to account for occurrence of the current symbol in the current context comprises contexts that characteristics of a clean signal indicate will have similar statistical characteristics in the clean signal.

4. The process of claim 1, wherein the contexts associated with increased probabilities resulting from updating the data structure to account for occurrence of the current symbol in the current context comprises a first context and a second context that are such that a rotation of the second context makes the second context equal to the first context.

5. The process of claim 1, wherein the contexts associated with increased probabilities resulting from updating the data structure to account for occurrence of the current symbol in the current context comprises a first context and a second context that are such that a reflection of the second context makes the second context equal to the first context.

6. The process of claim 1, wherein updating the data structure comprises incrementing a component of a class count vector that corresponds to a context class containing multiple contexts.

7. The process of claim 6, wherein the context class includes each context for which a quantized difference between components of the context and a base value of the context is equal to a quantized difference between components of the current context and a base value of the current context.

8. The process of claim 7, wherein the base value of the context is equal to an average of the components of the context.

9. The process of claim 6, wherein the denoising pass comprises:
constructing from the data structure a first count vector corresponding to a first context of a received symbol having a value I, wherein the first context is contained in the context class, and constructing the first count vector comprises selecting a subset of components of the class count vector for use as components of the first count vector;

using the first count vector, a channel model, and a signal degradation model to identify a value J that is estimated to minimize overall degradation in the reconstructed signal relative to an original signal when the value J replaces the value I in the first context, wherein the channel model indicates a probability for a channel to convert an input symbol having a first value to a received symbol having a second value in the received signal, and the signal degradation model indicates signal degradation that occurs if a symbol having the value I is replaced by another symbol value; and replacing each occurrence of the value I that appears in the first context in the received signal with the value J.

10. The process of claim 9, wherein constructing the first count vector further comprises combining components of the class count vector that are not in the selected subset to produce at least one of the components of the first count vector.

11. The process of claim 6, wherein the incremented component of the class count vector corresponds to a difference between the current symbol and an index base of the current context.

12. The process of claim 11, wherein the index base of the current context is equal to an average of the components of the current context.

13. The process of claim 1, wherein the received signal represents a received continuous tone image.

14. The process of claim 13, wherein each context comprises a set of received symbols that are in a two-dimensional neighborhood in the received image.

15. One or more computer-readable media containing computer-executable instructions that, when executed by a processor, perform the process of claim 1.

16. A denoising process comprising:
a modeling pass that includes:
selecting a current symbol from a noisy signal representing a noisy image;
determining a base symbol for a current context of the current symbol;
determining a difference context containing differences between components of the current context and the base symbol;
quantizing the difference context to produce a quantized difference context;
updating a component of a class count vector that corresponds to the quantized difference context; and
repeating the above steps a plurality of times to generate a plurality of the class count vectors; and
a denoising pass that includes using the class count vectors to determine whether to replace a symbol in the noisy signal when generating a reconstructed signal.

17. The process of claim 16, wherein the denoising pass comprises:
selecting from the noisy signal a target symbol that has a value I in a context $\eta$ in the noisy signal;
determining a difference context $\Delta\eta$ containing differences between components of the context $\eta$ and a base symbol $\bar{\eta}$ of the context $\eta$;
quantizing the difference context $\Delta\eta$ to produce a quantized difference context $Q(\Delta\eta)$;
constructing the count vector corresponding to the context $\eta$ using a subset of components of the class count vector corresponding to the quantized difference context $Q(\Delta\eta)$;

using the count vector, a channel model, and a signal degradation model to identify a value J that is estimated to minimize overall image degradation in the denoised image relative to an original image when the value J replaces the value I in the first context, wherein the channel model indicates a probability for a channel to convert an input symbol having a first value to a received symbol having a second value in the received signal, and the signal degradation model indicates signal degradation that occurs if a symbol having the value I is replaced by another symbol value; and replacing each occurrence of the value I that appears in the first context in the received image with the value J.

18. The process of claim 17, wherein updating the component of the class count vector comprises:
determining an index base symbol for the current context; and
incrementing the component corresponding to a difference between the current symbol and the index base signal in the class count vector.

19. The process of claim 18, wherein constructing the count vector comprises using a component that has an index i in the class count vector as a component having an index in the count vector that differs from the index i by the index base symbol of the context of the target symbol.

20. The process of claim 16, wherein determining the base symbol for the current context comprises determining an average of the components of the current context.

21. The process of claim 16, wherein updating the component of the class count vector comprises:
determining an index base symbol for the current context; and
incrementing the component corresponding to a difference between the current symbol and the index base signal in the class count vector.

22. The process of claim 16, wherein the denoising pass comprises:
constructing from the class count vector a first count vector corresponding to a first context of a first symbol having a value I in the noisy signal;
using the first count vector, a channel model, and a signal degradation model to identify a value J that is estimated to minimize overall degradation in the reconstructed signal relative to an original signal when the value J replaces the value I in the first context, wherein the channel model indicates a probability for a channel to convert an input symbol having a first value to a received symbol having a second-value in the noisy signal, and the signal degradation model indicates signal degradation that occurs if a symbol having the value I is replaced by another symbol value; and
replacing each occurrence of the value I that appears in the first context in the noisy signal with the value J when generating the reconstructed signal.

23. One or more computer-readable media containing computer-executable instructions that, when executed by a processor, perform the process of claim 16.

24. A denoising system comprising:
a modeler connected to receive a noisy signal, wherein the modeler processes the noisy signal and generates a plurality of class count vectors, wherein each class count vector indicates probabilities for occurrences of symbols in a class of contexts, the class of contexts including a plurality of contexts; and
a denoiser that receives the class count vector, wherein the model generates a reconstructed signal from the noisy signal by using the class count vectors to determine whether to replace a symbol in the noisy signal when generating the reconstructed signal.

25. The system of claim 24, wherein the modeler processes the noisy signal by executing a process including:
- selecting a current symbol from the noisy signal;
- determining a base symbol for a current context of the current symbol;
- determining a difference context containing differences between components of the current context and the base symbol;
- quantizing the difference context to produce a quantized difference context;
- updating a component of one of the class count vectors that corresponds to the quantized difference context; and
- repeating the above steps a plurality of times to generate the class count vectors.

26. The system of claim 24, wherein the denoiser processes the noisy signal by executing a process including:
- constructing from the class count vectors a first count vector corresponding to a first context of a first symbol having a value I in the noisy signal;
- using the first count vector, a channel model, and a signal degradation model to identify a value J that is estimated to minimize overall degradation in the reconstructed signal relative to an original signal when the value J replaces the value I in the first context, wherein the channel model indicates a probability for a channel to convert an input symbol having a first value to a received symbol having a second value in the noisy signal, and the signal degradation model indicates signal degradation that occurs if a symbol having the value I is replaced by another symbol value; and
- replacing each occurrence of the value I that appears in the first context in the noisy signal with the value J when generating the reconstructed signal.

27. The system of claim 26, wherein constructing the first count vector corresponding to the first context comprises using a subset of the components of the class count vector of the class containing the first context.

28. The process of claim 26, wherein constructing the count vector further comprises using a component that has an index i in the class count vector of the class containing the first context as a component having an index in the first count vector that differs from the index i.

* * * * *

UNITED STATES PATENT AND TRADEMARK OFFICE
CERTIFICATE OF CORRECTION

PATENT NO. : 7,271,749 B2
APPLICATION NO. : 11/180066
DATED : September 18, 2007
INVENTOR(S) : Itschak Weissman et al.

Page 1 of 1

It is certified that error appears in the above-identified patent and that said Letters Patent is hereby corrected as shown below:

In column 5, line 16, delete "as" and insert -- $a_i$ --, therefor.

In column 14, line 26, delete "q" and insert -- $\eta$ --, therefor.

In column 17, line 11, delete " $(\lambda_{a_x} \pi \odot_{a_\alpha})$ " and insert -- $(\lambda_{a_x} \odot \pi_{a_\alpha})$ --, therefor.

In column 24, line 20, in Claim 2, delete "mimize" and insert -- minimize --, therefor.

In column 26, line 48, in Claim 22, delete "second-value" and insert -- second value --, therefor.

Signed and Sealed this

Twenty-second Day of July, 2008

JON W. DUDAS
*Director of the United States Patent and Trademark Office*